United States Patent
Hashimoto

(10) Patent No.: US 9,195,031 B2
(45) Date of Patent: Nov. 24, 2015

(54) IMAGING LENS

(71) Applicant: KANTATSU CO., LTD., Yaita-shi, Tochigi (JP)

(72) Inventor: Masaya Hashimoto, Sukagawa (JP)

(73) Assignee: KANTATSU CO., LTD., Tochigi (JP)

( * ) Notice: Subject to any disclaimer, the term of this patent is extended or adjusted under 35 U.S.C. 154(b) by 0 days.

(21) Appl. No.: 14/454,919

(22) Filed: Aug. 8, 2014

(65) Prior Publication Data

US 2015/0098136 A1    Apr. 9, 2015

(30) Foreign Application Priority Data

Oct. 4, 2013  (JP) ................ 2013-209029

(51) Int. Cl.
  G02B 3/02     (2006.01)
  G02B 13/18    (2006.01)
  G02B 9/60     (2006.01)
  G02B 13/00    (2006.01)

(52) U.S. Cl.
  CPC .............. G02B 13/0045 (2013.01); G02B 9/60 (2013.01); G02B 13/18 (2013.01)

(58) Field of Classification Search
  CPC ....... G02B 9/60; G02B 13/0045; G02B 13/18
  USPC ................. 359/714, 764
  See application file for complete search history.

(56) References Cited

U.S. PATENT DOCUMENTS

| | | | |
|---|---|---|---|
| 8,873,165 B1 * | 10/2014 | Chung et al. ............ | 359/714 |
| 2010/0214467 A1 | 8/2010 | Ohtsu | |
| 2011/0228409 A1 | 9/2011 | Uchida | |
| 2012/0105704 A1 | 5/2012 | Huang et al. | |
| 2012/0250167 A1 | 10/2012 | Hashimoto | |
| 2013/0093938 A1 | 4/2013 | Otsu | |
| 2013/0188263 A1 * | 7/2013 | Tsai et al. ............ | 359/714 |
| 2013/0242412 A1 | 9/2013 | Uchida et al. | |
| 2013/0258164 A1 | 10/2013 | Chang et al. | |

(Continued)

FOREIGN PATENT DOCUMENTS

| CN | 201903684 U | 7/2011 |
|---|---|---|
| CN | 103076672 A | 5/2013 |

(Continued)

*Primary Examiner* — William Choi

(74) *Attorney, Agent, or Firm* — Westerman, Hattori, Daniels & Adrian, LLP

(57) ABSTRACT

An imaging lens forms an image on a solid-state image sensor. The constituent elements are arranged in order from an object side: an aperture stop, positive first lens having a convex object-side surface, negative second lens having a concave image-side surface, positive or negative double-sided aspheric third lens, positive fourth lens having a convex image-side surface, and negative double-sided aspheric fifth lens having a concave image-side surface. In addition, all of the lenses are made of plastic, and conditional expressions (1) through (4) below are satisfied:

$$2.0 < r7/r8 < 5.0 \tag{1}$$

$$-1.35 < f4/f5 < -0.8 \tag{2}$$

$$TLA/2ih < 0.80 \tag{3}$$

$$1.50 < Nd < 1.65, \tag{4}$$

where r7 denotes curvature radius of the fourth lens object-side surface, r8 denotes curvature radius of the fourth lens image-side surface, f4 denotes fourth lens focal length, f5 denotes fifth lens focal length, TLA denotes total track length, ih denotes maximum image height, and Nd denotes refractive index at d-ray of the first to fifth lenses.

7 Claims, 18 Drawing Sheets

(56) References Cited

U.S. PATENT DOCUMENTS

| | | |
|---|---|---|
| 2013/0258185 A1 | 10/2013 | Chang et al. |
| 2013/0342919 A1 | 12/2013 | Tang et al. |
| 2014/0063596 A1 | 3/2014 | Jung et al. |
| 2014/0063619 A1 | 3/2014 | Lai |
| 2014/0092487 A1 | 4/2014 | Chen et al. |
| 2014/0125857 A1 | 5/2014 | Chang et al. |
| 2014/0218812 A1 | 8/2014 | Liou |
| 2014/0233111 A1 | 8/2014 | Teraoka |
| 2014/0268362 A1 | 9/2014 | Lee |

FOREIGN PATENT DOCUMENTS

| | | |
|---|---|---|
| CN | 103135205 A | 6/2013 |
| JP | 2010-26434 A | 2/2010 |
| JP | 2010-271541 A | 12/2010 |

\* cited by examiner

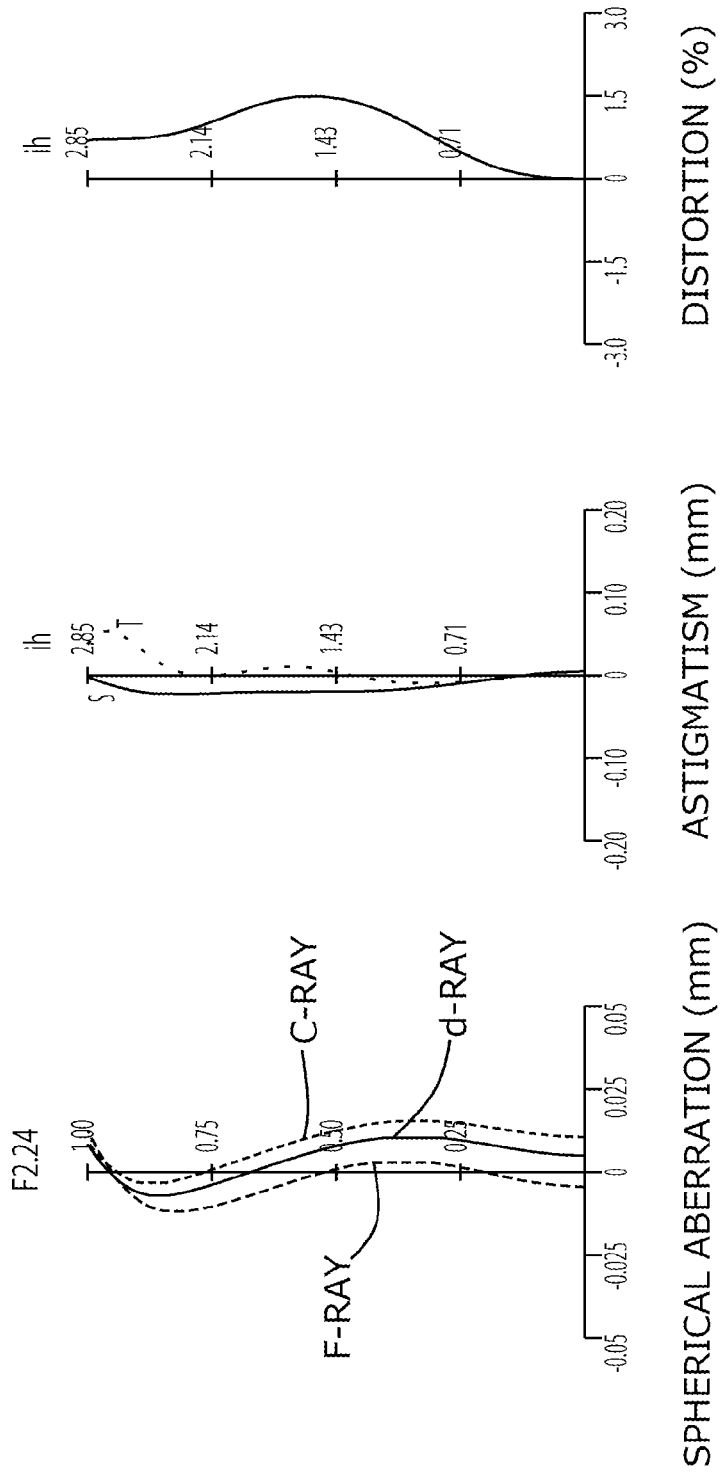

IMAGING LENS

The present application is based on and claims priority of Japanese patent application No. 2013-209029 filed on Oct. 4, 2013, the entire contents of which are hereby incorporated by reference.

BACKGROUND OF THE INVENTION

1. Field of the Invention

The present invention relates to imaging lenses which form an image of an object on a solid-state image sensor such as a CCD sensor or a C-MOS sensor used in a compact image pickup device. More particularly, the invention relates to imaging lenses which are built in image pickup devices mounted in increasingly compact and low-profile smartphones, mobile phones and PDAs (Personal Digital Assistants), information terminals such as game consoles and PCs, and further in consumer electronics added with a camera function and the like.

2. Description of the Related Art

In recent years, it is becoming popular to mount a camera function to numerous information terminals. Further, consumer electronics with camera are also appearing in the market, and for example, it becomes possible to view the situation of one's house in a timely fashion through the camera mounted in the devices even from outside, by using a smartphone to communicate with the consumer electronics. As explained above, it is expected that product development to improve convenience of consumers by integrating the camera function into the information terminals and consumer electronics will progress continuously in the future. Cameras to be mounted in such devices are naturally required to have high resolution corresponding to the increase in the number of pixels, and also required to be compact with a low height, have a bright lens system, and moreover correspond to wide field of view.

However, correction of aberrations is difficult at peripheral portion of an image, in obtaining a low-height, wide field of view, and bright imaging lens, and it is difficult to secure good optical performance for overall image. It is possible to solve these problems to a certain extent by adopting a glass material as a lens material. However, the glass material is not suitable for mass production, so that a problem arises in providing the lens at low cost in large quantities.

Conventionally, as an imaging lens aiming at wide field of view and high functionality, for example, the imaging lens described in JP-A-2010-271541 (Patent Document 1) and the imaging lens described in JP-A-2010-026434 (Patent Document 2) are known.

Patent Document 1 discloses an imaging lens which includes, arranged in order from an object side to an image side, a first lens with positive refractive power as a biconvex lens, a second lens with negative refractive power having a concave surface on an image-side surface, a third lens with positive refractive power as a meniscus lens having a convex surface on an image-side surface, and a fourth lens with negative refractive power having an aspheric shape on both surfaces and having a concave surface on an image-side surface near an optical axis.

Further, Patent Document 2 discloses an imaging lens which includes, in order from the object side, a positive first lens, a positive second lens, a negative third lens, a positive fourth lens, and a negative fifth lens, which aims at downsizing and favorable correction of various aberrations.

In the imaging lens described in Patent Document 1, total track length is in the order of 5.4 mm, so that reduction in height is relatively achieved. However, correction of aberrations is not sufficient, since it has four constituent lenses. Further, maximum field of view is in the order of 70 degrees to 75 degrees, so that a wide field of view is relatively obtained. However, it is difficult to correspond to recent request for wider field of view. Still further, F-value is in the order of 2.8, and it is difficult to correspond to recent request for brighter lens system.

In the imaging lens described in Patent Document 2, the total track length is in the order of 7.8 mm, and is longer than a length of a diagonal of an effective image plane of the image sensor, so that it is disadvantageous in reducing height. Further, it achieves a bright lens system which corrects various aberrations favorably with five constituent lenses, with an F-value in the order of 2.0 to 2.5. However, maximum field of view is in the order of 62 degrees, and it is difficult to correspond to wider field of view.

As stated above, in the conventional techniques, it is difficult to correspond to high-resolution, downsizing, reduction in height, and also satisfy the request for wider field of view.

SUMMARY OF THE INVENTION

The present invention has been made in view of the above problems, and an object thereof is to provide a small-sized, low-height and low-cost imaging lens with five constituent lenses, which provides a wide field of view, corrects various aberrations favorably, and corresponds to sufficient brightness.

Here, a "low-height" means a level in which the total track length is shorter than a length of a diagonal of an effective image plane of the image sensor, and a "wide field of view" means a level of 70 degrees or more in full field of view.

According to one aspect of the present invention, there is provided an imaging lens which forms an image of an object on a solid-state image sensor, in which the elements are arranged in order from an object side to an image side: an aperture stop; a first lens with positive refractive power having a convex surface on the object side; a second lens with negative refractive power having a concave surface on the image side; a third lens with positive or negative refractive power as a double-sided aspheric lens; a fourth lens with positive refractive power having a convex surface on the image side; and a fifth lens with negative refractive power having a concave surface on the image side near an optical axis as a double-sided aspheric lens, all the lenses are made of plastic material, and conditional expressions (1) through (4) below are satisfied:

$$2.0 < r7/r8 < 5.0 \tag{1}$$

$$-1.35 < f4/f5 < -0.8 \tag{2}$$

$$TLA/2ih < 0.80 \tag{3}$$

$$1.50 < Nd < 1.65 \tag{4}$$

where r7: curvature radius of the object-side surface of the fourth lens r8: curvature radius of the image-side surface of the fourth lens f4: focal length of the fourth lens f5: focal length of the fifth lens TLA: distance on the optical axis from the object-side surface of an optical element nearest to the object to the image plane in which filters are removed (total track length)

ih: maximum image height

Nd: refractive index with respect to d-ray of the first lens, the second lens, the third lens, the fourth lens, and the fifth lens.

The imaging lens of the above-mentioned configuration has a power arrangement close to a telephoto type, so that the total track length is shortened. The second lens properly corrects spherical aberrations and chromatic aberrations which occur on the first lens with positive refractive power. The third lens, a double-sided aspheric lens with weak positive or negative refractive power, suppresses axial chromatic aberrations, high-order spherical aberrations and coma aberrations small. The fourth lens with strong positive refractive power maintains reduction in height, and also corrects astigmatism and field curvature. Further, the fifth lens with negative refractive power corrects spherical aberrations which occur on the fourth lens and corrects field curvature satisfactorily.

The conditional expression (1) is for defining the shape of the fourth lens near the axis to an adequate range. If the value is above the upper limit of the conditional expression (1), the positive refractive power of the fourth lens would be too strong, making it difficult to correct spherical aberrations. On the other hand, if the value is below the lower limit of the conditional expression (1), the refractive power of the fourth lens would be too weak, making it difficult to correct astigmatism and field curvature.

More preferably, the imaging lens according to the present invention satisfies a conditional expression (1a) below:

$$2.5 < r7/r8 < 4.5 \quad (1a)$$

The conditional expression (2) is for defining a relationship between the refractive powers of the fourth lens and the fifth lens to an adequate range. By defining the relationship within the range of the conditional expression (2), it becomes possible to correct chromatic aberrations and field curvature properly.

More preferably, the imaging lens according to the present invention satisfies a conditional expression (2a) below:

$$-1.25 < f4/f5 < -0.9 \quad (2a)$$

The conditional expression (3) defines a relationship between the total track length and the maximum image height, and is a condition for achieving reduction in height. If the value is above the upper limit of the conditional expression (3), the total track length increases and makes it difficult to reduce height.

More preferably, the imaging lens according to the present invention satisfies a conditional expression (3a) below:

$$TLA/2ih < 0.78 \quad (3a)$$

The conditional expression (4) defines the refractive index of each lens constituting the imaging lens. By defining the refractive index within the range of the conditional expression (4), it becomes possible to provide the imaging lens with good performance while reducing cost.

Preferably, the fifth lens of the present invention has a biconcave shape near the optical axis, or has a meniscus shape having a convex surface on the object side near the optical axis. If the lens has a biconcave shape near the optical axis, it becomes possible to set positive refractive power stronger because aberrations which occur on the fourth lens become easier to be corrected with the fifth lens, so that it is more advantageous in reducing height. If the lens has a meniscus shape having a convex surface on the object side near the optical axis, field curvature may be corrected more favorably.

Preferably, the imaging lens of the present invention satisfies a conditional expression (5) below.

$$0.7 < ih/f < 1.0 \quad (5)$$

where
ih: maximum image height
f: focal length of the overall optical system of the imaging lens The conditional expression (5) defines a relationship between the maximum image height and the focal length of the overall optical system of the imaging lens to an adequate range. If the value is above the upper limit of the conditional expression (5), it is advantageous in reducing height. However, the field of view becomes too wide, so that correction of various aberrations especially in the peripheral portion of the image becomes difficult. On the other hand, if the value is below the lower limit of the conditional expression (5), the focal length becomes too long, so that reduction in height becomes difficult.

Preferably, the imaging lens according to the present invention satisfies conditional expressions (6) and (7) below.

$$0.9 < TLA/f < 1.45 \quad (6)$$

$$0.24 < bf/f < 0.41 \quad (7)$$

where
TLA: distance on the optical axis from the object-side surface of an optical element nearest to the object to the image plane in which filters are removed (total track length)
bf: distance on the optical axis from the image-side surface of the fifth lens to the image plane in which filters are removed (back focus)
f: focal length of the overall optical system of the imaging lens.

The conditional expression (6) is for defining a relationship between the total track length and the focal length of the overall optical system of the imaging lens to an adequate range. If the value is above the upper limit of the conditional expression (6), the total track length becomes too long, so that reduction in height becomes difficult. On the other hand, if the value is below the lower limit of the conditional expression (6), the total track length becomes too short, which is advantageous in reducing height, but it is not preferable since the correction of various aberrations becomes difficult, and error sensitivity upon manufacturing increases.

More preferably, the imaging lens according to the present invention satisfies a conditional expression (6a) below:

$$1.0 < TLA/f < 1.30 \quad (6a)$$

The conditional expression (7) is for defining a relationship between the back focus and the focal length of the overall optical system of the imaging lens to an adequate range. By setting the relationship within the range of the conditional expression (7), a space for arranging a filter such as an infrared cut filter may be secured.

More preferably, the imaging lens according to the present invention satisfies a conditional expression (7a) below:

$$0.27 < bf/f < 0.38 \quad (7a)$$

Preferably, the imaging lens of the present invention satisfies a conditional expression (8) below:

$$f4 < f1 \quad (8)$$

where
f1: focal length of the first lens
f4: focal length of the fourth lens.

The conditional expression (8) defines the relationship between the refractive powers of the first lens and the fourth lens.

In the imaging lens of the present invention, reduction in height is provided by the first lens and the fourth lens with positive refractive power. As shown in the conditional expression (8), reduction in height is achieved by setting the refractive power of the fourth lens to be stronger than the refractive power of the first lens.

Preferably, the imaging lens according to the present invention satisfies a conditional expression (9) below:

$$0.50 < r4/f < 1.0 \quad (9)$$

where r4: curvature radius of the image-side surface of the second lens f: focal length of the overall optical system of the imaging lens.

The conditional expression (9) is for defining a relationship between the curvature radius of the image-side surface of the second lens and the focal length of the overall optical system of the imaging lens to an adequate range. If the value is above the upper limit of the conditional expression (9), negative refractive power on the image-side surface of the second lens becomes too weak, so that correction of chromatic aberration may easily be insufficient. On the other hand, if the value is below the lower limit of the conditional expression (9), the negative refractive power on the image-side surface of the second lens becomes too strong, and the error sensitivity of the lens surface increases, so that mass production while maintaining stable performance becomes difficult.

More preferably, the imaging lens according to the present invention satisfies a conditional expression (9a) below:

$$0.55 < r4/f < 0.90 \quad (9a)$$

BRIEF DESCRIPTION OF THE DRAWINGS

FIG. 18 shows spherical aberration, astigmatism, and distortion of the imaging lens according to Example 9.

DETAILED DESCRIPTION OF THE PREFERRED EMBODIMENTS

Hereinafter, the preferred embodiment of the present invention will be described in detail referring to the accompanying drawings. FIGS. 1, 3, 5, 7, 9, 11, 13, 15, and 17 are schematic views showing the general configurations of the imaging lenses according to Examples 1 to 9 of the present embodiment, respectively. Since all these Examples have the same basic configuration, the lens configuration of the embodiment will be described below referring to the schematic view of Example 1.

Figure 1:
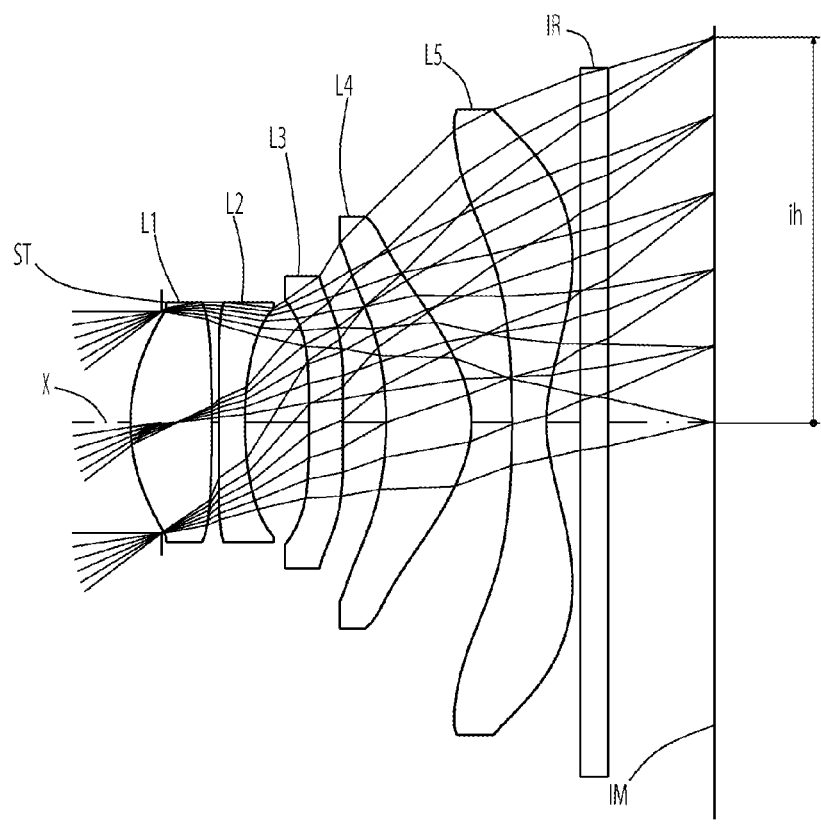
FIG. 1 is a schematic view showing the general configuration of an imaging lens according to Example 1.

As shown in FIG. 1, in the imaging lens according to the present embodiment, the elements are arranged in the following order from an object side to an image side: an aperture stop ST, a first lens L1 with positive refractive power having a convex surface on the object side, a second lens L2 with negative refractive power having a concave surface on the image side, a third lens L3 with positive or negative refractive power as a double-sided aspheric lens, a fourth lens L4 with positive refractive power having a convex surface on the image side, and a fifth lens L5 with negative refractive power having a concave surface on the image side near an optical axis X as a double-sided aspheric lens. Further, all the lenses are made of plastic material. The aperture stop ST is located on an image plane IM side than the apex of the object-side surface of the first lens L1.

Further, a filter IR of a plane parallel plate is located between the fifth lens L5 and the image plane IM. This filter IR is omissible. An image-forming position of an optical system varies by a thickness of the filter IR. Therefore, a total track length TLA, and a back focus bf in the present invention are each defined as a corresponding distance in which the filter IR is removed.

In the above-mentioned imaging lens with five constituent lenses, the first lens L1 is a lens having a convex surface on both the object-side surface and the image-side surface, the second lens L2 is a lens having a concave surface on both the object-side surface and the image-side surface, the third lens L3 is a double-sided aspheric lens of a meniscus shape having a convex surface on the object side near the optical axis X, the fourth lens L4 is a meniscus lens having a convex surface on the image side, and the fifth lens L5 is a double-sided aspheric lens having a concave surface on both the image-side surface and the object-side surface near the optical axis X.

The imaging lens with the above-mentioned configuration has a power arrangement close to a telephoto type, so that the total track length is shortened.

The first lens L1 suppresses the occurrence of spherical aberrations, by setting a curvature radius of the object-side surface to have a smaller value than a curvature radius of the image-side surface. Note here that the shape of the first lens L1 is not limited to the biconvex shape, and may be a meniscus shape having a concave surface on the image side, as shown in Examples 2, 6, 7, and 8.

The second lens L2 satisfactorily corrects spherical aberrations and chromatic aberrations which occur on the first lens L1 with positive refractive power. Note here that the shape of the second lens L2 is not limited to the biconcave shape, and may be a meniscus shape, as shown in Examples 2 and 4 through 9.

The third lens L3 is a double-sided aspheric lens with a weakest positive or negative refractive power in the imaging lens, and has a meniscus shape having a convex surface on the object side near the optical axis X. Further, the third lens L3 suppresses axial chromatic aberrations, high-order spherical aberrations and coma aberrations, from the effect of aspheric surface formed on both surfaces. Note here that the refractive power and the aspheric shape of the third lens L3 vary according to the refractive power and the shape of the lens group arranged on the object side than the third lens L3. That is, for example, Examples 1 through 6 and 9 are examples in which positive composite refractive power of the first lens L1 and the second lens L2 is set comparatively strong at 1.0 to 1.5 times with respect to the focal length of the overall optical system, and in this case, the third lens L3 with weak positive or negative refractive power has an aspheric shape which changes toward the object side in the peripheral portion on both surfaces. On the other hand, Examples 7 and 8 are examples in which positive composite refractive power of the first lens L1 and the second lens L2 is set comparatively weak at 2.0 times or more with respect to the focal length of the overall optical system, and in this case, the third lens L3 with positive refractive power has an aspheric shape which changes toward the image side in the peripheral portion on both surfaces. Note here that the shape of the third lens L3 near the optical axis X is not limited to the meniscus shape, and may be a biconvex shape, as shown in Example 9.

The fourth lens L4 is a lens with stronger positive refractive power than the first lens L1, and corrects astigmatism and field curvature, while reducing height. Further, both the surfaces are appropriately aspheric, and contribute especially to correcting aberrations in the peripheral portion.

The fifth lens L5 is a double-sided aspheric lens having a biconcave shape near the optical axis X, and corrects spherical aberrations which occur on the fourth lens L4, and also corrects field curvature satisfactorily. Further, by having a concave surface on the image-side surface, back focus is secured easily, and also by having an aspheric shape with a pole-change point at a position other than the optical axis X on the image-side surface, an angle of a ray of the peripheral portion incident on the image plane IM is controlled adequately. Note here that the fifth lens L5 may be a meniscus shape having a convex surface on the object side near the optical axis X, as shown in Example 9. In this case, particularly, the field curvature in the peripheral portion is corrected favorably.

The imaging lens according to the present invention satisfies conditional expressions below:

$$2.0 < r7/r8 < 5.0 \quad (1)$$

$$-1.35 < f4/f5 < -0.8 \quad (2)$$

$$TLA/2ih < 0.80 \quad (3)$$

$$1.50 < Nd < 1.65 \quad (4)$$

$$0.7 < ih/f < 1.0 \quad (5)$$

$$0.9 < TLA/f < 1.45 \quad (6)$$

$$0.24 < bf/f < 0.41 \quad (7)$$

$$f4 < f1 \quad (8)$$

$$0.50 < r4/f < 1.0 \quad (9)$$

where
r7: curvature radius of the object-side surface of the fourth lens L4
r8: curvature radius of the image-side surface of the fourth lens L4
f4: focal length of the fourth lens L4
f5: focal length of the fifth lens L5
Nd: refractive index with respect to d-ray at the first lens L1, the second lens L2, the third lens L3, the fourth lens L4, and the fifth lens L5
ih: maximum image height
f: focal length of the overall optical system of the imaging lens
TLA: distance on the optical axis X from the object-side surface of an optical element nearest to the object to the image plane IM in which the filter IR is removed (total track length)
bf: distance on the optical axis X from the image-side surface of the fifth lens L5 to the image plane IM in which the filter IR is removed (back focus)
f1: focal length of the first lens L1
f4: focal length of the fourth lens L4
r4: curvature radius of the image-side surface of the second lens L2

In this embodiment, all the lens surfaces are aspheric. The aspheric shapes of these lens surfaces are expressed by the following Equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1+\sqrt{1-(k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{Equation 1}$$

Next, the imaging lenses according to Examples of the present embodiment will be explained. In each Example, f denotes the focal length of the overall optical system of the imaging lens, Fno denotes an F-value, ω denotes a half field of view, ih denotes a maximum image height, and TLA denotes a total track length in which the filter IR is removed. i denotes a surface number counted from the object side, r denotes a curvature radius, d denotes the distance on the optical axis between lens surfaces (surface distance), Nd denotes a refractive index with respect to d-ray (reference wavelength), and vd denotes an Abbe number with respect to d-ray. As for aspheric surfaces, an asterisk (*) after surface number i indicates that the surface concerned is an aspheric surface.

Example 1

The basic lens data is shown below in Table 1.

TABLE 1

| Example 1 in mm |
|---|
| f = 3.80 |
| Fno = 2.25 |
| ω(°) = 37.3 |
| ih = 2.93 |
| TLA = 4.38 |
| b f = 1.22 |

| Surface Data | | | | |
|---|---|---|---|---|
| Surface No. i | Curvature Radius r | Surface Distance d | Refractive Index Nd | Abbe Number vd |
| (Object Surface) | Infinity | Infinity | | |
| 1 (Stop) | Infinity | −0.235 | | |
| 2* | 1.432 | 0.619 | 1.544 | 55.57 |

TABLE 1-continued

Example 1 in mm f = 3.80

Fno = 2.25

ω(°) = 37.3 ih = 2.93

TLA = 4.38 b f = 1.22

| | | | | |
|---|---:|---:|---:|---:|
| 3* | −14.874 | 0.052 | | |
| 4* | −55.294 | 0.200 | 1.635 | 23.97 |
| 5* | 2.760 | 0.486 | | |
| 6* | 56.649 | 0.258 | 1.635 | 23.97 |
| 7* | 16.286 | 0.331 | | |
| 8* | −2.857 | 0.651 | 1.544 | 55.57 |
| 9* | −0.843 | 0.309 | | |
| 10* | −8.284 | 0.260 | 1.535 | 56.16 |
| 11* | 1.158 | 0.260 | | |
| 12 | Infinity | 0.210 | 1.517 | 64.20 |
| 13 | Infinity | 0.811 | | |
| Image Plane | Infinity | | | |

Constituent Lens Data

| Lens | Start Surface | Focal Length |
|---|---:|---:|
| 1 | 2 | 2.435 |
| 2 | 4 | −4.134 |
| 3 | 6 | −36.089 |
| 4 | 8 | 1.973 |
| 5 | 10 | −1.883 |

Aspheric Surface Data

| | 2nd Surface | 3rd Surface | 4th Surface | 5th Surface | 6th Surface |
|---|---:|---:|---:|---:|---:|
| k | −5.831E+00 | 0.000E+00 | −9.900E+01 | 5.796E+00 | 0.000E+00 |
| A4 | 2.334E−01 | −1.858E−02 | 2.375E−02 | 3.157E−03 | −2.182E−01 |
| A6 | −1.844E−01 | 5.007E−02 | 4.920E−02 | 9.589E−02 | −1.771E−01 |
| A8 | 1.105E−01 | −2.637E−01 | 1.488E−01 | 4.166E−02 | 3.096E−01 |
| A10 | −1.388E−02 | 3.515E−01 | −6.387E−01 | −2.691E−01 | −1.790E−01 |
| A12 | −6.347E−02 | −3.106E−01 | 8.081E−01 | 3.053E−01 | 1.122E−02 |
| A14 | −1.738E−02 | 1.012E−01 | −3.081E−01 | −3.097E−02 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---:|---:|---:|---:|---:|
| k | −9.900E+01 | 2.466E+00 | −3.422E+00 | 0.000E+00 | −9.035E+00 |
| A4 | −1.909E−01 | −4.322E−02 | −1.384E−01 | −8.677E−03 | −6.554E−02 |
| A6 | −8.490E−02 | 7.305E−02 | 1.347E−01 | −2.075E−02 | 1.597E−02 |
| A8 | 1.294E−01 | −1.622E−01 | −8.579E−02 | 8.570E−03 | −4.766E−03 |
| A10 | −3.598E−02 | 2.009E−01 | 4.229E−02 | −6.229E−04 | 9.705E−04 |
| A12 | 1.402E−02 | −9.625E−02 | −1.000E−02 | −1.231E−04 | −1.212E−04 |
| A14 | 0.000E+00 | 1.597E−02 | 5.431E−04 | 1.525E−05 | 7.192E−06 |
| A16 | 0.000E+00 | 0.000E+00 | 0.000E+00 | 0.000E+00 | 0.000E+00 |

As shown in Table 10, the imaging lens according to Example 1 satisfies all the conditional expressions (1) to (9).

Figure 2:
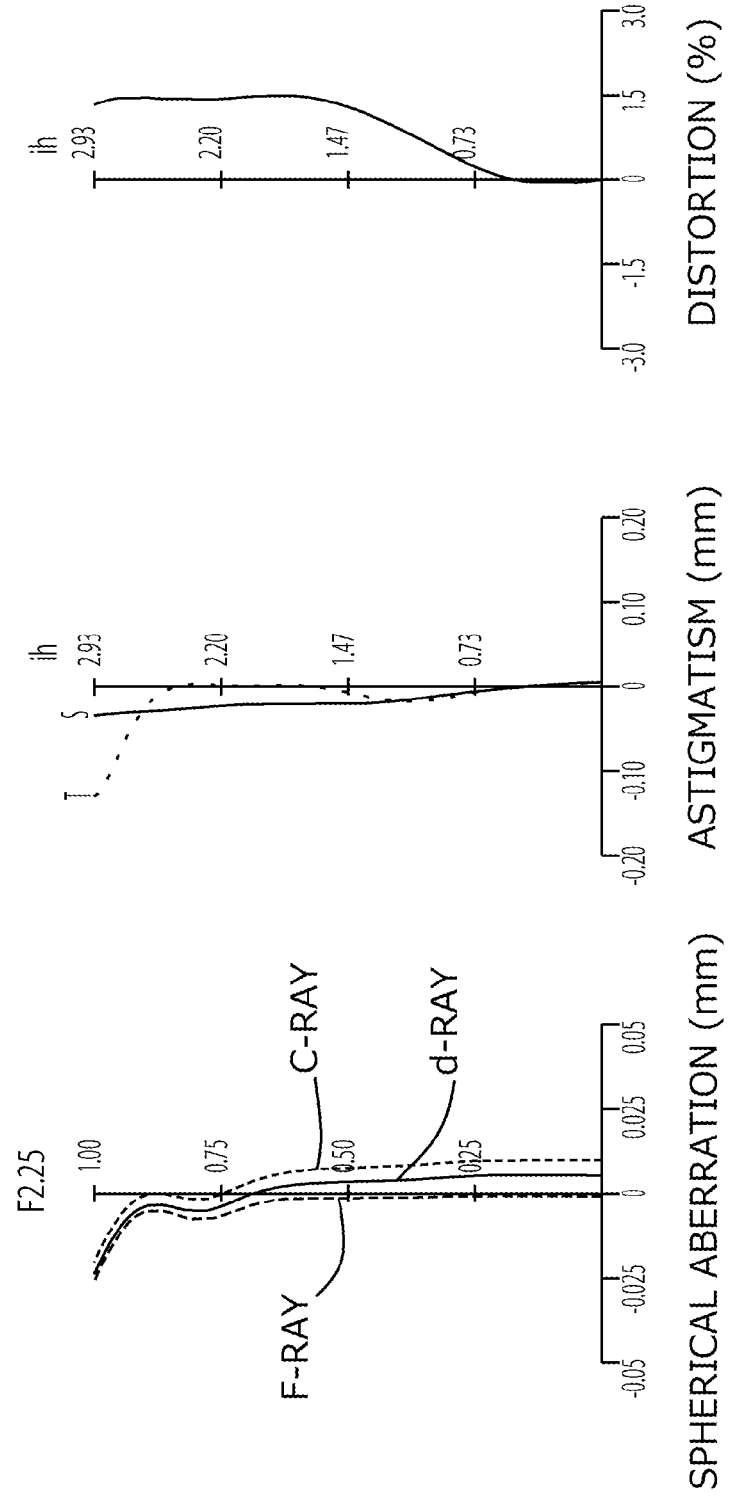
FIG. 2 shows spherical aberration, astigmatism, and distortion of the imaging lens according to Example 1.
Figure 3:
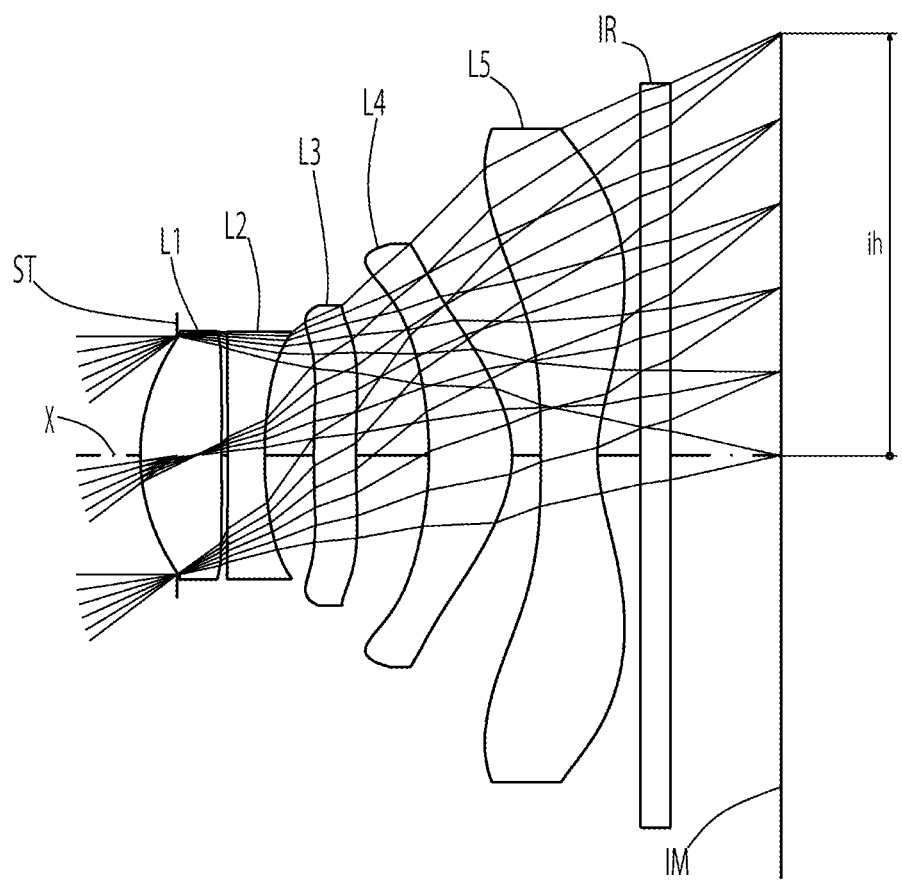
FIG. 3 is a schematic view showing the general configuration of an imaging lens according to Example 2.

FIG. 2 shows spherical aberration (mm), astigmatism (mm), and distortion (%) of the imaging lens according to Example 1. The spherical aberration graph shows the amount of aberration at wavelengths of F-ray (486 nm), d-ray (588 nm), and C-ray (656 nm). The astigmatism graph shows the amount of aberration on sagittal image surface S and the amount of aberration on tangential image surface T at d-ray (the same is true for FIGS. 4, 6, 8, 10, 12, 14, 16, and 18). As shown in FIG. 2, each aberration is properly corrected.

Further, the total track length TLA is 4.38 mm, so that reduction in height is realized with five constituent lenses. Further, the imaging lens provides a wide field of view of nearly 75 degrees and brightness with an F-value of 2.25.

Example 2

The basic lens data is shown below in Table 2.

TABLE 2

Example 2
in mm
f = 3.80
Fno = 2.29
ω(°) = 37.2
ih = 2.93
TLA = 4.38
bf = 1.22

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.254 | | |
| 2* | 1.412 | 0.564 | 1.544 | 55.57 |
| 3* | 16.003 | 0.042 | | |
| 4* | 19.140 | 0.257 | 1.635 | 23.97 |
| 5* | 2.615 | 0.342 | | |
| 6* | 5.119 | 0.294 | 1.544 | 55.57 |
| 7* | 7.292 | 0.506 | | |
| 8* | −2.747 | 0.578 | 1.544 | 55.57 |
| 9* | −0.844 | 0.200 | | |
| 10* | −12.764 | 0.393 | 1.544 | 55.57 |
| 11* | 1.078164 | 0.300 | | |
| 12 | Infinity | 0.210 | 1.517 | 64.17 |
| 13 | Infinity | 0.767 | | |
| Image Plane | Infinity | | | |

Constituent Lens Data

| Lens | Start Surface | Focal Length |
|---|---|---|
| 1 | 2 | 2.809 |
| 2 | 4 | −4.799 |
| 3 | 6 | 30.151 |
| 4 | 8 | 2.022 |
| 5 | 10 | −1.810 |

Aspheric Surface Data

| | 2nd Surface | 3rd Surface | 4th Surface | 5th Surface | 6th Surface |
|---|---|---|---|---|---|
| k | 2.950E−01 | 0.000E+00 | 0.000E+00 | −2.182E+00 | 0.000E+00 |
| A4 | −1.546E−02 | −3.274E−01 | −3.997E−01 | −1.213E−01 | −2.305E−01 |
| A6 | −2.995E−03 | 1.234E+00 | 1.729E+00 | 6.981E−01 | 2.058E−02 |
| A8 | 2.229E−02 | −2.733E+00 | −3.935E+00 | −1.244E+00 | −1.007E−01 |
| A10 | −1.921E−01 | 4.183E+00 | 6.156E+00 | 1.659E+00 | 2.595E−01 |
| A12 | 3.577E−01 | −4.412E+00 | −6.307E+00 | −1.415E+00 | −4.124E−01 |
| A14 | −2.768E−01 | 1.978E+00 | 2.824E+00 | 6.238E−01 | 3.359E−01 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −3.451E+00 | 0.000E+00 | −8.551E+00 |
| A4 | −1.519E−01 | 3.251E−03 | −1.105E−01 | −9.794E−02 | −1.009E−01 |
| A6 | 7.232E−03 | −1.780E−02 | 7.627E−03 | 2.486E−02 | 4.339E−02 |
| A8 | −1.809E−01 | 2.966E−02 | −2.973E−02 | 5.651E−03 | −1.527E−02 |
| A10 | 3.617E−01 | −4.670E−02 | 2.637E−02 | −3.392E−03 | 3.392E−03 |
| A12 | −3.898E−01 | 9.443E−03 | −1.313E−02 | 5.610E−04 | −4.369E−04 |
| A14 | 1.922E−01 | 4.124E−03 | 1.990E−03 | −3.217E−05 | 2.508E−05 |
| A16 | 0.000E+00 | 0.000E+00 | 0.000E+00 | 0.000E+00 | 0.000E+00 |

As shown in Table 10, the imaging lens according to Example 2 satisfies all the conditional expressions (1) to (9).

Figure 4:
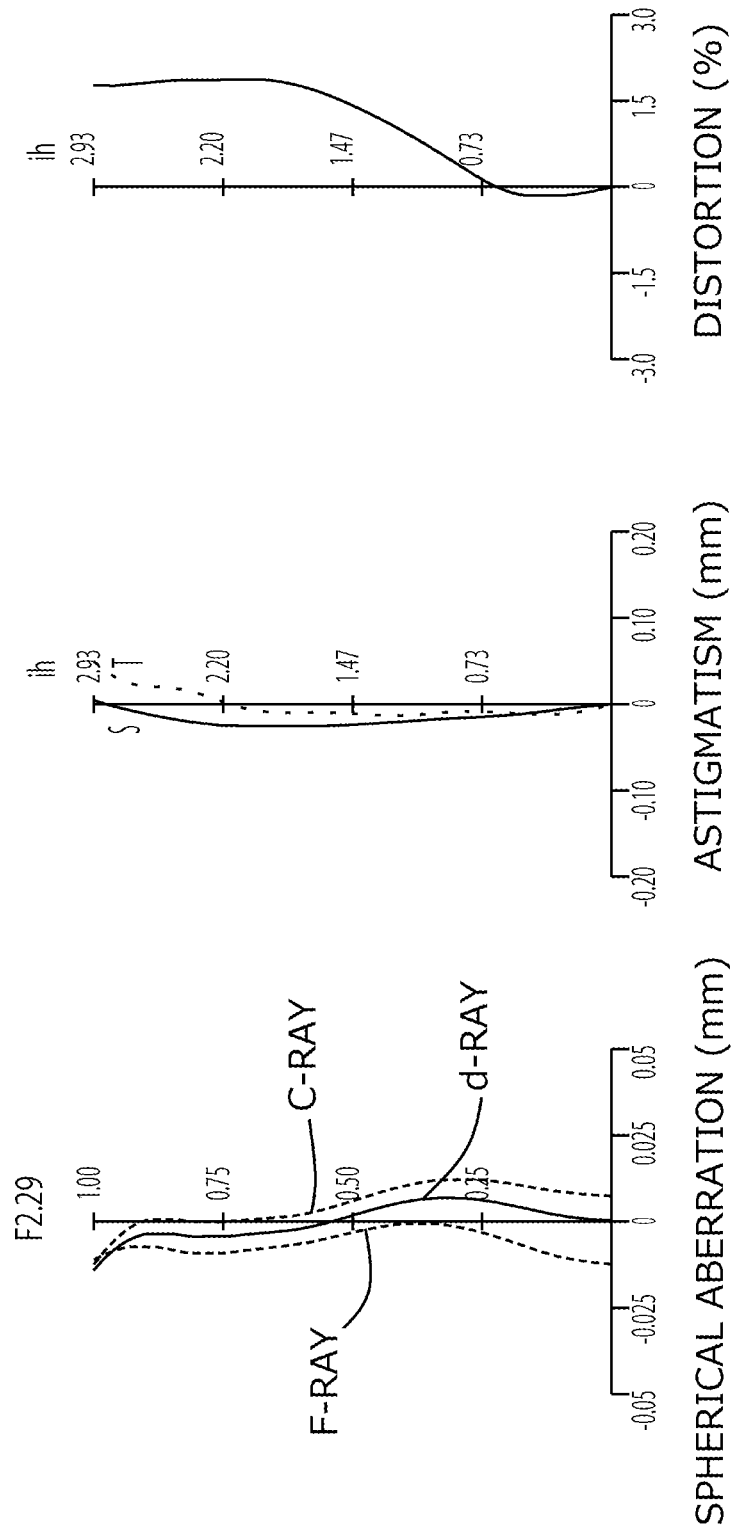
FIG. 4 shows spherical aberration, astigmatism, and distortion of the imaging lens according to Example 2.
Figure 5:
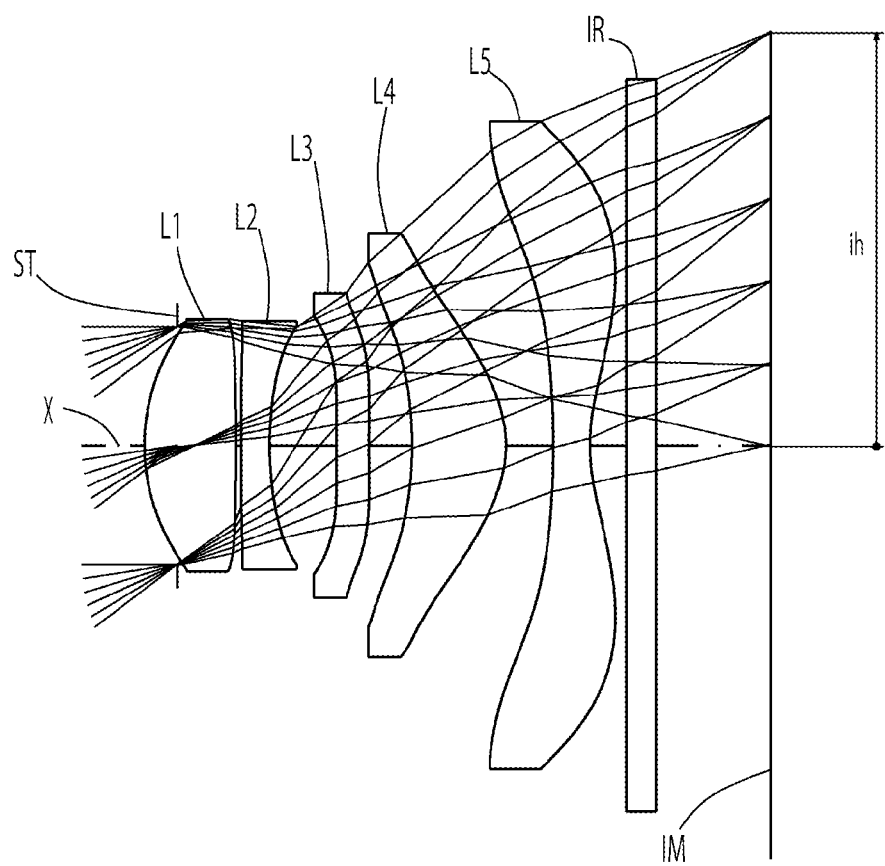
FIG. 5 is a schematic view showing the general configuration of an imaging lens according to Example 3.

FIG. 4 shows spherical aberration (mm), astigmatism (mm), and distortion (%) of the imaging lens according to Example 2. As shown in FIG. 4, each aberration is properly corrected.

Further, the total track length TLA is 4.38 mm, so that reduction in height is realized with five constituent lenses.

Further, the imaging lens provides a wide field of view of nearly 74 degrees and brightness with an F-value of 2.29.

Example 3

The basic lens data is shown below in Table 3.

TABLE 3

Example 3
in mm
f = 3.80
Fno = 2.25
ω(°) = 37.3
ih = 2.93
TLA = 4.38
bf = 1.22

| Surface Data | | | | |
|---|---|---|---|---|
| Surface No. i | Curvature Radius r | Surface Distance d | Refractive Index Nd | Abbe Number vd |
| (Object Surface) | Infinity | Infinity | | |
| 1 (Stop) | Infinity | −0.235 | | |
| 2* | 1.415 | 0.651 | 1.544 | 55.57 |
| 3* | −17.597 | 0.039 | | |
| 4* | −77.642 | 0.200 | 1.635 | 23.97 |
| 5* | 2.684 | 0.477 | | |
| 6* | 45.560 | 0.229 | 1.635 | 23.97 |
| 7* | 17.406 | 0.306 | | |
| 8* | −2.707 | 0.667 | 1.544 | 55.57 |
| 9* | −0.856 | 0.336 | | |
| 10* | −6.585 | 0.260 | 1.535 | 56.16 |
| 11* | 1.260 | 0.260 | | |
| 12 | Infinity | 0.210 | 1.517 | 64.20 |
| 13 | Infinity | 0.813 | | |
| Image Plane | Infinity | | | |

| Constituent Lens Data | | |
|---|---|---|
| Lens | Start Surface | Focal Length |
| 1 | 2 | 2.438 |
| 2 | 4 | −4.082 |
| 3 | 6 | −44.502 |
| 4 | 8 | 2.041 |
| 5 | 10 | −1.956 |

| Aspheric Surface Data | | | | | |
|---|---|---|---|---|---|
| | 2nd Surface | 3rd Surface | 4th Surface | 5th Surface | 6th Surface |
| k | −5.692E+00 | 0.000E+00 | 0.000E+00 | 5.541E+00 | 0.000E+00 |
| A4 | 2.441E−01 | 2.794E−02 | 4.981E−02 | 1.632E−03 | −2.213E−01 |
| A6 | −1.796E−01 | 1.067E−02 | −1.114E−02 | 8.473E−02 | −1.538E−01 |
| A8 | 1.266E−01 | −2.808E−01 | 1.041E−01 | −4.056E−03 | 2.846E−01 |
| A10 | −2.400E−03 | 3.587E−01 | −6.256E−01 | −2.373E−01 | −1.661E−01 |
| A12 | −6.365E−02 | −3.105E−01 | 8.081E−01 | 3.053E−01 | 1.128E−02 |
| A14 | −1.738E−02 | 1.012E−01 | −3.081E−01 | −3.097E−02 | 0.000E+00 |
| A16 | 0.000E+00 | 0.000E+00 | 0.000E+00 | 0.000E+00 | 0.000E+00 |
| | 7th Surface | 8th Surface | 9th Surface | 10th Surface | 11th Surface |
| k | −3.389E+01 | 1.749E+00 | −3.338E+00 | 0.000E+00 | −9.975E+00 |
| A4 | −1.947E−01 | −4.057E−02 | −1.444E−01 | −3.639E−03 | −6.512E−02 |
| A6 | −7.219E−02 | 8.072E−02 | 1.395E−01 | −2.071E−02 | 1.644E−02 |
| A8 | 1.175E−01 | −1.592E−01 | −8.415E−02 | 8.567E−03 | −4.967E−03 |
| A10 | −3.009E−02 | 1.980E−01 | 4.177E−02 | −6.468E−04 | 1.003E−03 |
| A12 | 1.255E−02 | −9.759E−02 | −1.020E−02 | −1.254E−04 | −1.212E−04 |
| A14 | 0.000E+00 | 1.639E−02 | 5.131E−04 | 1.597E−05 | 6.876E−06 |
| A16 | 0.000E+00 | 0.000E+00 | 0.000E+00 | 0.000E+00 | 0.000E+00 |

As shown in Table 10, the imaging lens according to Example 3 satisfies all the conditional expressions (1) to (9).

Figure 6:
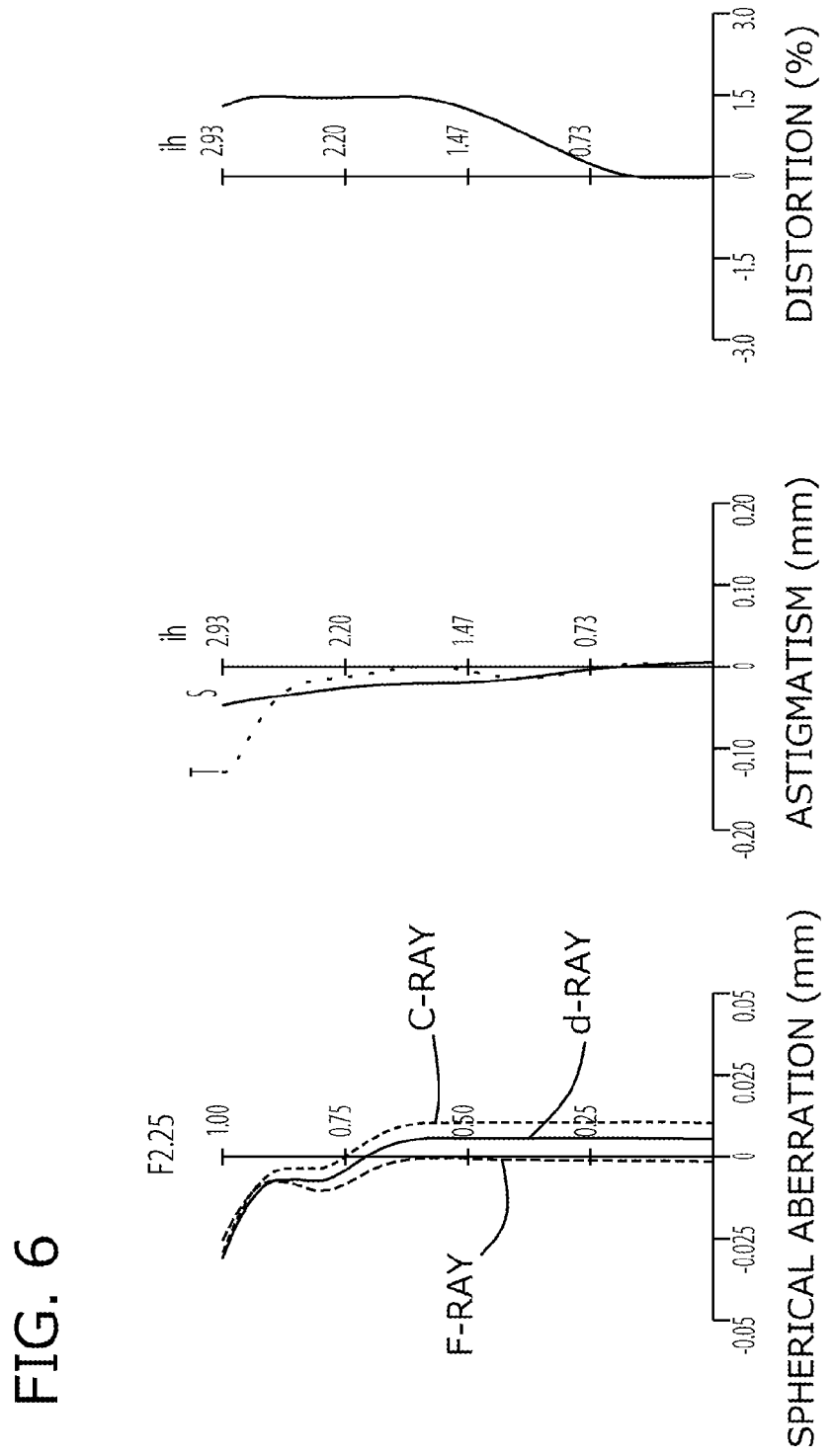
FIG. 6 shows spherical aberration, astigmatism, and distortion of the imaging lens according to Example 3.
Figure 7:
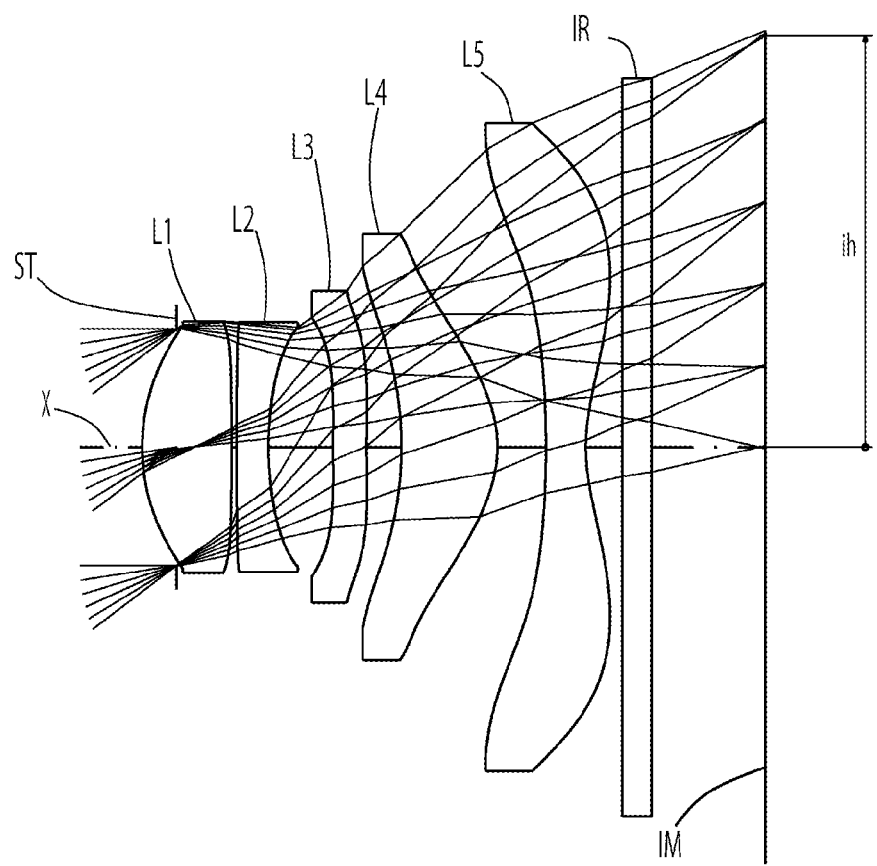
FIG. 7 is a schematic view showing the general configuration of an imaging lens according to Example 4.

FIG. 6 shows spherical aberration (mm), astigmatism (mm), and distortion (%) of the imaging lens according to Example 3. As shown in FIG. 6, each aberration is properly corrected.

Further, the total track length TLA is 4.38 mm, so that reduction in height is realized with five constituent lenses.

Further, the imaging lens provides a wide field of view of nearly 75 degrees and brightness with an F-value of 2.25.

Example 4

The basic lens data is shown below in Table 4.

TABLE 4

Example 4
in mm
f = 3.81
Fno = 2.25
ω(°) = 37.3
ih = 2.93
TLA = 4.38
bf = 1.22

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.245 | | |
| 2* | 1.405 | 0.638 | 1.544 | 55.57 |
| 3* | −24.855 | 0.034 | | |
| 4* | 99.000 | 0.230 | 1.635 | 23.97 |
| 5* | 2.652 | 0.458 | | |
| 6* | 27.534 | 0.242 | 1.635 | 23.97 |
| 7* | 12.646 | 0.247 | | |
| 8* | −2.571 | 0.685 | 1.544 | 55.57 |
| 9* | −0.878 | 0.345 | | |
| 10* | −7.417 | 0.285 | 1.544 | 55.57 |
| 11* | 1.338 | 0.260 | | |
| 12 | Infinity | 0.210 | 1.517 | 64.20 |
| 13 | Infinity | 0.812 | | |
| Image Plane | Infinity | | | |

Constituent Lens Data

| Lens | Start Surface | Focal Length |
|---|---|---|
| 1 | 2 | 2.466 |
| 2 | 4 | −4.295 |
| 3 | 6 | −37.066 |
| 4 | 8 | 2.146 |
| 5 | 10 | −2.060 |

Aspheric Surface Data

| | 2nd Surface | 3rd Surface | 4th Surface | 5th Surface | 6th Surface |
|---|---|---|---|---|---|
| k | −5.581E+00 | 0.000E+00 | 0.000E+00 | 6.192E+00 | 0.000E+00 |
| A4 | 2.440E−01 | 1.530E−02 | 4.485E−02 | 1.637E−04 | −2.140E−01 |
| A6 | −1.873E−01 | 1.616E−03 | −3.430E−02 | 8.551E−02 | −1.196E−01 |
| A8 | 1.573E−01 | −2.969E−01 | 1.114E−01 | −2.482E−02 | 2.945E−01 |
| A10 | −5.118E−02 | 3.977E−01 | −5.814E−01 | −2.139E−01 | −2.163E−01 |
| A12 | −6.348E−02 | −3.108E−01 | 8.082E−01 | 3.053E−01 | 1.234E−02 |
| A14 | 0.000E+00 | 1.011E−01 | −3.080E−01 | −3.097E−02 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 7.627E+01 | 1.349E+00 | −3.355E+00 | 0.000E+00 | −1.054E+01 |
| A4 | −1.872E−01 | −1.743E−02 | −1.312E−01 | −3.799E−03 | −6.337E−02 |
| A6 | −5.371E−02 | 7.802E−02 | 1.421E−01 | −2.146E−02 | 1.597E−02 |
| A8 | 1.111E−01 | −1.591E−01 | −8.525E−02 | 8.612E−03 | −4.890E−03 |
| A10 | −3.996E−02 | 1.974E−01 | 4.093E−02 | −6.283E−04 | 9.913E−04 |
| A12 | 1.100E−02 | −9.809E−02 | −1.057E−02 | −1.237E−04 | −1.245E−04 |
| A14 | 0.000E+00 | 1.670E−02 | 8.015E−04 | 1.543E−05 | 7.563E−06 |
| A16 | 0.000E+00 | 0.000E+00 | 0.000E+00 | 0.000E+00 | 0.000E+00 |

As shown in Table 10, the imaging lens according to Example 4 satisfies all the conditional expressions (1) to (9).

Figure 8:
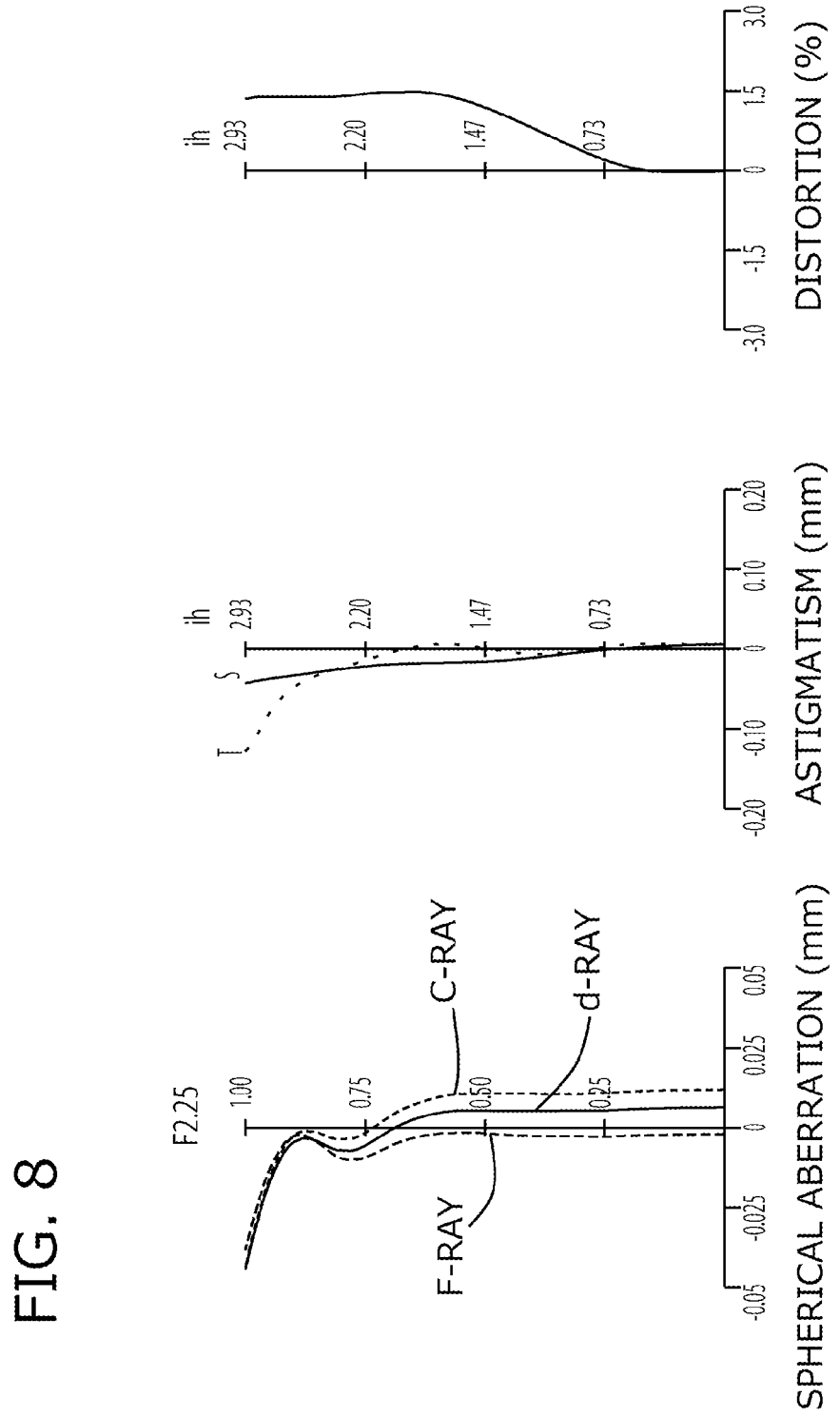
FIG. 8 shows spherical aberration, astigmatism, and distortion of the imaging lens according to Example 4.
Figure 9:
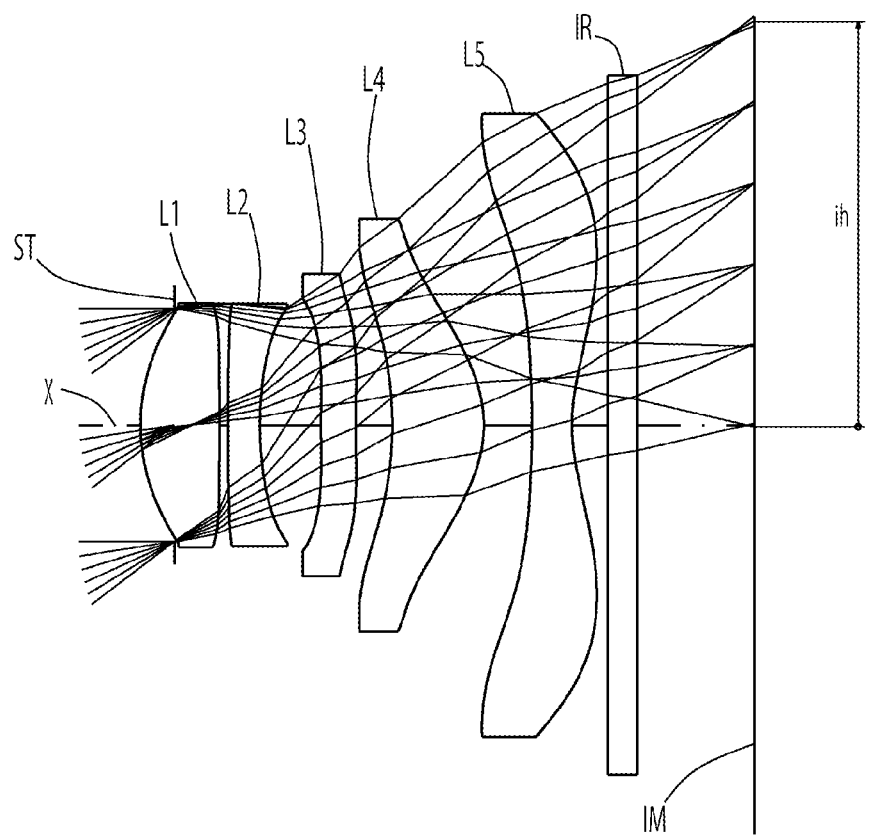
FIG. 9 is a schematic view showing the general configuration of an imaging lens according to Example 5.

FIG. 8 shows spherical aberration (mm), astigmatism (mm), and distortion (%) of the imaging lens according to Example 4. As shown in FIG. 8, each aberration is properly corrected.

Further, the total track length TLA is 4.38 mm, so that reduction in height is realized with five constituent lenses.

Further, the imaging lens provides a wide field of view of nearly 75 degrees and brightness with an F-value of 2.25.

Example 5

The basic lens data is shown below in Table 5.

TABLE 5

Example 5
in mm
f = 3.81
Fno = 2.25
ω(°) = 37.3
ih = 2.93
TLA = 4.38
bf = 1.25

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.245 | | |
| 2* | 1.418 | 0.572 | 1.544 | 55.57 |
| 3* | −45.862 | 0.064 | | |
| 4* | 99.000 | 0.230 | 1.635 | 23.97 |
| 5* | 2.740 | 0.442 | | |
| 6* | 15.650 | 0.252 | 1.635 | 23.97 |
| 7* | 10.159 | 0.266 | | |
| 8* | −2.611 | 0.664 | 1.544 | 55.57 |
| 9* | −0.888 | 0.347 | | |
| 10* | −8.976 | 0.291 | 1.544 | 55.57 |
| 11* | 1.331 | 0.260 | | |
| 12 | Infinity | 0.210 | 1.517 | 64.20 |
| 13 | Infinity | 0.850 | | |
| Image Plane | Infinity | | | |

Constituent Lens Data

| Lens | Start Surface | Focal Length |
|---|---|---|
| 1 | 2 | 2.540 |
| 2 | 4 | −4.443 |
| 3 | 6 | −46.423 |
| 4 | 8 | 2.177 |
| 5 | 10 | −2.111 |

Aspheric Surface Data

| | 2nd Surface | 3rd Surface | 4th Surface | 5th Surface | 6th Surface |
|---|---|---|---|---|---|
| k | −5.695E+00 | 0.000E+00 | 0.000E+00 | 6.149E+00 | 0.000E+00 |
| A4 | 2.404E−01 | 7.778E−03 | 4.809E−02 | 7.564E−03 | −2.120E−01 |
| A6 | −1.913E−01 | 8.253E−03 | −3.102E−01 | 8.440E−02 | −1.199E−01 |
| A8 | 1.639E−01 | −2.850E−01 | 1.149E−01 | −2.866E−02 | 3.009E−01 |
| A10 | −7.624E−02 | 3.857E−01 | −5.601E−01 | −2.116E−01 | −2.155E−01 |
| A12 | −6.214E−02 | −3.106E−01 | 8.083E−01 | 3.133E−01 | 0.000E+00 |
| A14 | 0.000E+00 | 1.027E−01 | −3.082E−01 | −3.644E−02 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 4.618E+01 | 1.462E+00 | −3.378E+00 | 0.000E+00 | −1.008E+01 |
| A4 | −1.886E−01 | −9.911E−03 | −1.238E−01 | −2.951E−03 | −6.203E−02 |
| A6 | −4.828E−02 | 8.133E−02 | 1.459E−01 | −2.167E−02 | 1.586E−02 |
| A8 | 1.149E−01 | −1.575E−01 | −8.490E−02 | 8.604E−03 | −4.856E−03 |
| A10 | −4.127E−02 | 1.969E−01 | 4.023E−02 | −6.228E−04 | 9.927E−04 |
| A12 | 1.093E−02 | −9.893E−02 | −1.075E−02 | −1.230E−04 | −1.240E−04 |
| A14 | 0.000E+00 | 1.693E−02 | 8.891E−04 | 1.530E−05 | 7.588E−06 |
| A16 | 0.000E+00 | 0.000E+00 | 0.000E+00 | 0.000E+00 | 0.000E+00 |

As shown in Table 10, the imaging lens according to Example 5 satisfies all the conditional expressions (1) to (9).

Figure 10:
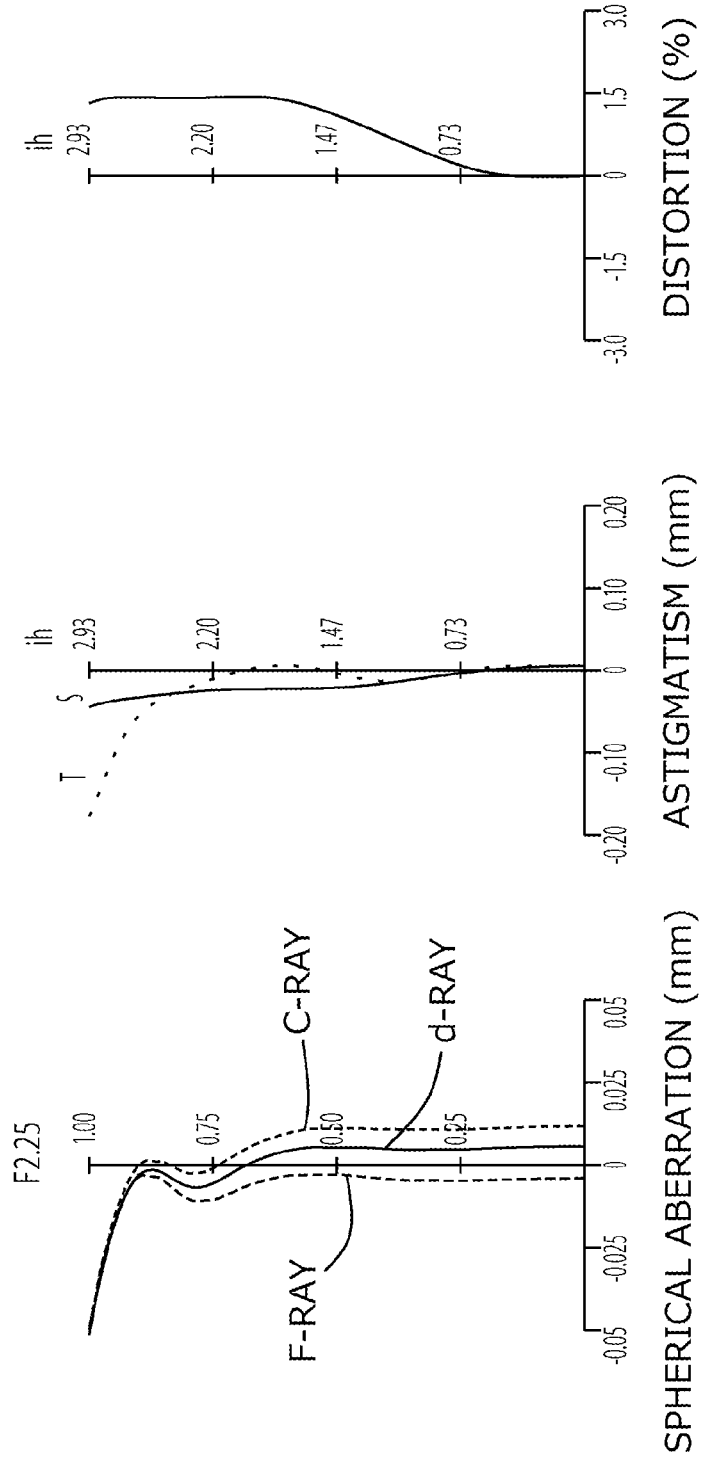
FIG. 10 shows spherical aberration, astigmatism, and distortion of the imaging lens according to Example 5.
Figure 11:
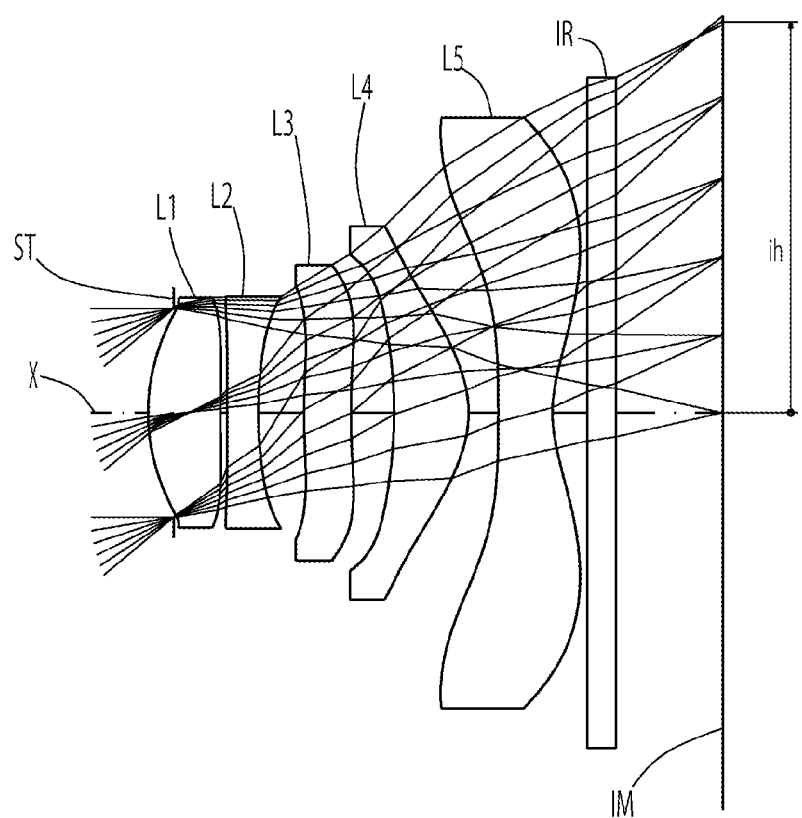
FIG. 11 is a schematic view showing the general configuration of an imaging lens according to Example 6.

FIG. 10 shows spherical aberration (mm), astigmatism (mm), and distortion (%) of the imaging lens according to Example 5. As shown in FIG. 10, each aberration is properly corrected.

Further, the total track length TLA is 4.38 mm, so that reduction in height is realized with five constituent lenses.

Further, the imaging lens provides a wide field of view of nearly 75 degrees and brightness with an F-value of 2.25.

Example 6

The basic lens data is shown below in Table 6.

TABLE 6

Example 6
in mm
f = 3.42
Fno = 2.25
ω(°) = 37.3
ih = 2.93
TLA = 4.11
bf = 1.17

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.185 | | |
| 2* | 1.433 | 0.526 | 1.544 | 55.57 |
| 3* | 9.744 | 0.050 | | |
| 4* | 14.565 | 0.227 | 1.635 | 23.97 |
| 5* | 3.073 | 0.332 | | |
| 6* | 4.776 | 0.342 | 1.544 | 55.57 |
| 7* | 4.750 | 0.314 | | |
| 8* | −3.361 | 0.542 | 1.544 | 55.57 |
| 9* | −0.824 | 0.217 | | |
| 10* | −17.345 | 0.395 | 1.535 | 56.16 |
| 11* | 1.021 | 0.250 | | |
| 12 | Infinity | 0.210 | 1.517 | 64.20 |
| 13 | Infinity | 0.778 | | |
| Image Plane | Infinity | | | |

Constituent Lens Data

| Lens | Start Surface | Focal Length |
|---|---|---|
| 1 | 2 | 3.023 |
| 2 | 4 | −6.182 |
| 3 | 6 | 443.946 |
| 4 | 8 | 1.866 |
| 5 | 10 | −1.790 |

Aspheric Surface Data

| | 2nd Surface | 3rd Surface | 4th Surface | 5th Surface | 6th Surface |
|---|---|---|---|---|---|
| k | 1.884E−01 | 0.000E+00 | 0.000E+00 | −2.540E+00 | 0.000E+00 |
| A4 | −1.983E−02 | −3.297E−01 | −3.758E−01 | −1.109E−01 | −2.313E−01 |
| A6 | 3.925E−02 | 1.139E+00 | 1.574E+00 | 7.317E−01 | 4.753E−02 |
| A8 | −1.824E−01 | −3.671E+00 | −4.267E+00 | −1.313E+00 | −1.595E−02 |
| A10 | 1.898E−02 | 6.682E+00 | 7.080E+00 | 1.650E+00 | 4.694E−03 |
| A12 | 4.155E−01 | −6.713E+00 | −6.724E+00 | −1.373E+00 | 5.659E−02 |
| A14 | −5.683E−01 | 2.721E+00 | 2.842E+00 | 6.327E−01 | −7.730E−02 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −3.482E+00 | 0.000E+00 | −7.586E+00 |
| A4 | −1.435E−01 | 1.494E−02 | −1.297E−01 | −1.157E−01 | −1.091E−01 |
| A6 | −8.709E−03 | 3.304E−02 | 1.068E−01 | 2.830E−02 | 4.675E−02 |
| A8 | −1.635E−01 | −7.027E−02 | −3.537E−03 | 6.151E−03 | −1.590E−02 |
| A10 | 3.419E−01 | −6.856E−04 | −9.146E−03 | −3.397E−03 | 3.329E−03 |
| A12 | −3.612E−01 | 0.000E+00 | −2.653E−03 | 4.998E−04 | −4.084E−04 |
| A14 | 1.424E−01 | 0.000E+00 | 1.297E−03 | −2.479E−05 | 2.282E−05 |
| A16 | 0.000E+00 | 0.000E+00 | 0.000E+00 | 0.000E+00 | 0.000E+00 |

As shown in Table 10, the imaging lens according to Example 6 satisfies all the conditional expressions (1) to (9).

Figure 12:
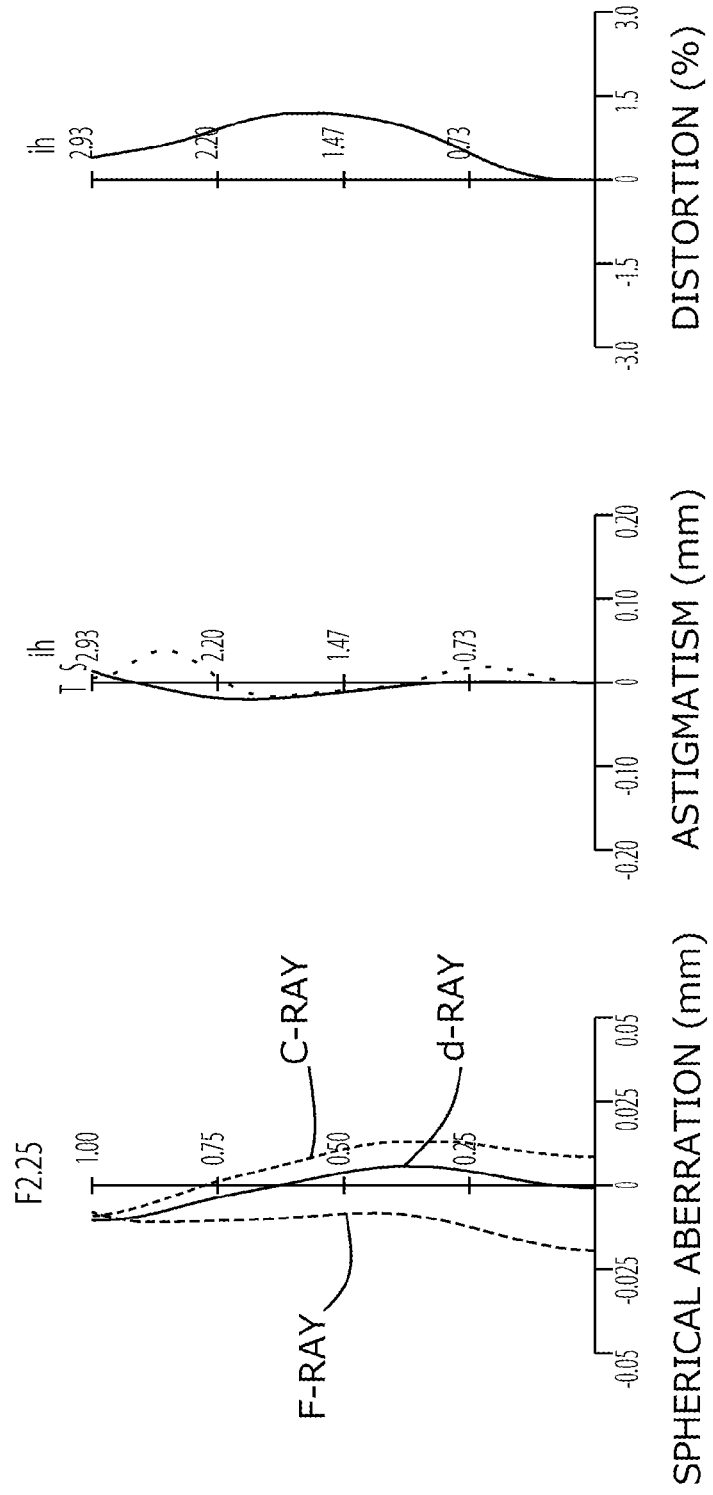
FIG. 12 shows spherical aberration, astigmatism, and distortion of the imaging lens according to Example 6.
Figure 13:
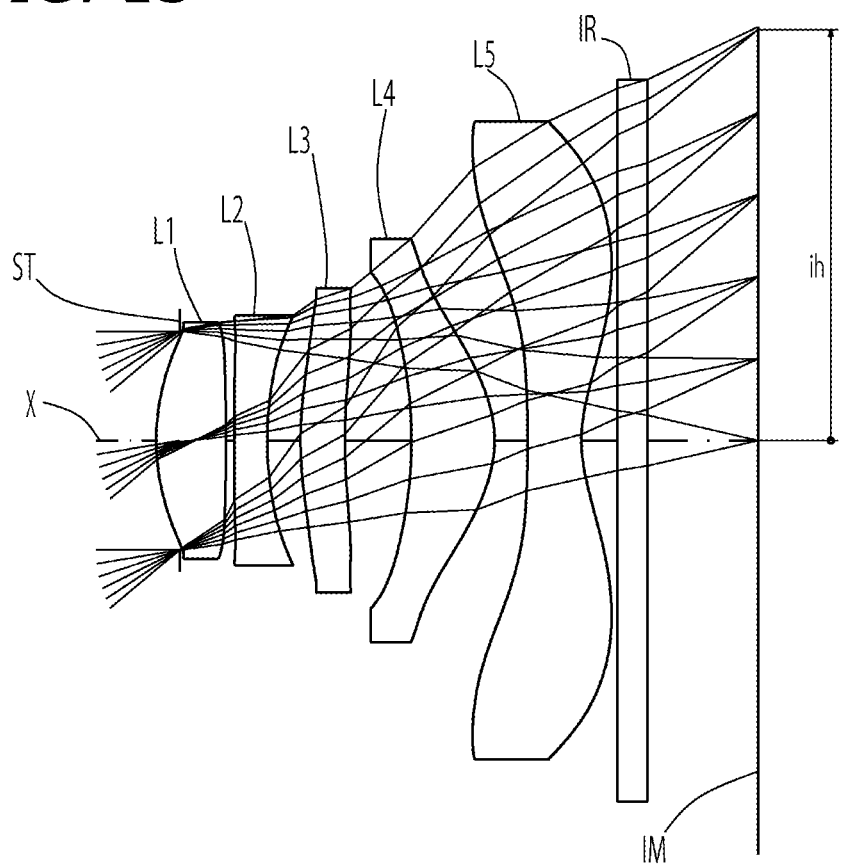
FIG. 13 is a schematic view showing the general configuration of an imaging lens according to Example 7.

FIG. 12 shows spherical aberration (mm), astigmatism (mm), and distortion (%) of the imaging lens according to Example 6. As shown in FIG. 12, each aberration is properly corrected.

Further, the total track length TLA is 4.11 mm, so that reduction in height is realized with five constituent lenses.

Further, the imaging lens provides a wide field of view of nearly 75 degrees and brightness with an F-value of 2.25.

Example 7

The basic lens data is shown below in Table 7.

TABLE 7

Example 7
in mm
f = 3.40
Fno = 2.23
$\omega(°)$ = 39.9
ih = 2.86
TLA = 4.12
bf = 1.16

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.164 | | |
| 2* | 1.566 | 0.482 | 1.544 | 55.57 |
| 3* | 89.640 | 0.061 | | |
| 4* | 13.658 | 0.228 | 1.635 | 23.97 |
| 5* | 2.183 | 0.231 | | |
| 6* | 2.358 | 0.309 | 1.544 | 55.57 |
| 7* | 3.998 | 0.463 | | |
| 8* | −3.026 | 0.577 | 1.544 | 55.57 |
| 9* | −0.834 | 0.228 | | |
| 10* | −18.473 | 0.376 | 1.535 | 56.16 |
| 11* | 1.009 | 0.250 | | |
| 12 | Infinity | 0.210 | 1.517 | 64.20 |
| 13 | Infinity | 0.767 | | |
| Image Plane | Infinity | | | |

Constituent Lens Data

| Lens | Start Surface | Focal Length |
|---|---|---|
| 1 | 2 | 2.926 |
| 2 | 4 | −4.125 |
| 3 | 6 | 9.917 |
| 4 | 8 | 1.937 |
| 5 | 10 | −1.777 |

Aspheric Surface Data

| | 2nd Surface | 3rd Surface | 4th Surface | 5th Surface | 6th Surface |
|---|---|---|---|---|---|
| k | 2.473E−01 | 0.000E+00 | 0.000E+00 | −9.169E+00 | 0.000E+00 |
| A4 | −1.623E−02 | −2.286E−01 | −3.276E−01 | −1.177E−01 | −2.180E−01 |
| A6 | −5.495E−02 | 1.042E+00 | 1.669E+00 | 8.082E−01 | 1.315E−01 |
| A8 | 2.305E−02 | −2.956E+00 | −4.227E+00 | −1.409E+00 | −9.956E−02 |
| A10 | −1.171E−01 | 4.726E+00 | 6.548E+00 | 1.594E+00 | 1.815E−01 |
| A12 | 3.174E−01 | −4.759E+00 | −6.600E+00 | −1.433E+00 | −1.033E−01 |
| A14 | −4.319E−01 | 2.069E+00 | 3.101E+00 | 6.806E−01 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −3.438E+00 | 0.000E+00 | −7.124E+00 |
| A4 | −8.966E−02 | −1.524E−02 | −1.375E−01 | −1.172E−01 | −1.095E−01 |
| A6 | −1.463E−02 | 6.179E−02 | 1.210E−01 | 3.168E−02 | 4.700E−02 |
| A8 | −5.970E−02 | −2.572E−02 | −3.094E−02 | 5.896E−03 | −1.609E−02 |
| A10 | 7.270E−02 | −4.389E−02 | 2.475E−02 | −3.653E−03 | 3.512E−03 |
| A12 | 0.000E+00 | 1.874E−02 | −1.596E−02 | 5.494E−04 | −4.539E−04 |
| A14 | 0.000E+00 | 0.000E+00 | 2.703E−03 | −2.701E−05 | 2.607E−05 |
| A16 | 0.000E+00 | 0.000E+00 | 0.000E+00 | 0.000E+00 | 0.000E+00 |

As shown in Table 10, the imaging lens according to Example 7 satisfies all the conditional expressions (1) to (9).

Figure 14:
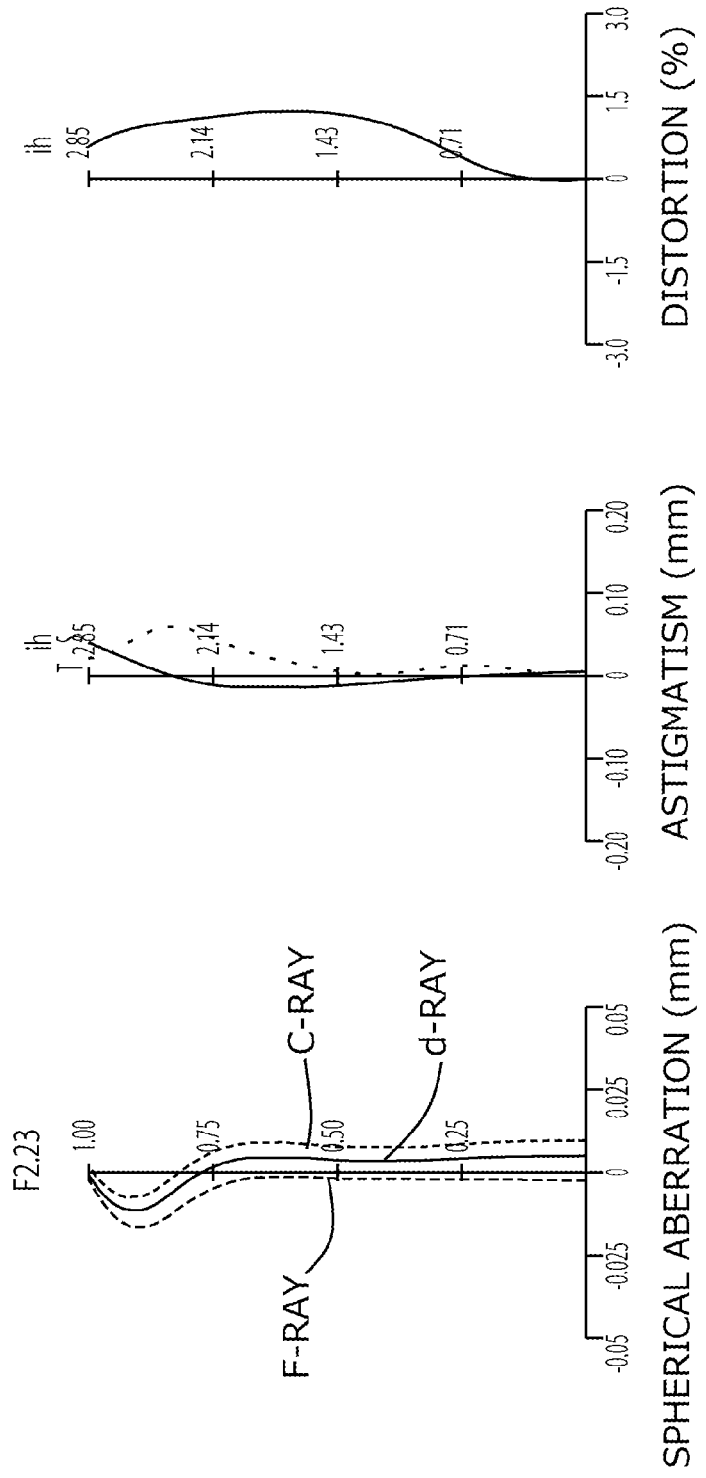
FIG. 14 shows spherical aberration, astigmatism, and distortion of the imaging lens according to Example 7.
Figure 15:
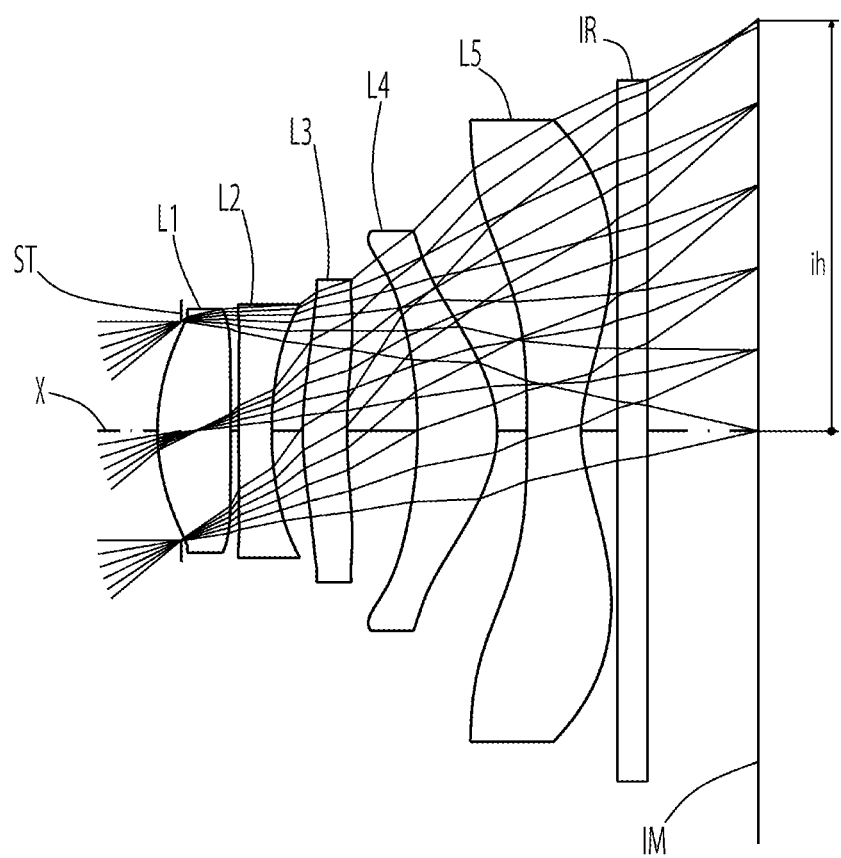
FIG. 15 is a schematic view showing the general configuration of an imaging lens according to Example 8.

FIG. 14 shows spherical aberration (mm), astigmatism (mm), and distortion (%) of the imaging lens according to Example 7. As shown in FIG. 14, each aberration is properly corrected.

Further, the total track length TLA is 4.12 mm, so that reduction in height is realized with five constituent lenses.

Further, the imaging lens provides a wide field of view of nearly 80 degrees and brightness with an F-value of 2.23.

Example 8

The basic lens data is shown below in Table 8.

TABLE 8

Example 8
in mm
f = 3.41
Fno = 2.24
ω(°) = 39.8
ih = 2.86
TLA = 4.11
bf = 1.17

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.165 | | |
| 2* | 1.524 | 0.508 | 1.544 | 55.57 |
| 3* | 38.148 | 0.056 | | |
| 4* | 17.629 | 0.229 | 1.635 | 23.97 |
| 5* | 2.156 | 0.216 | | |
| 6* | 2.216 | 0.309 | 1.544 | 55.57 |
| 7* | 3.859 | 0.490 | | |
| 8* | −2.974 | 0.553 | 1.544 | 55.57 |
| 9* | −0.813 | 0.206 | | |
| 10* | −20.439 | 0.378 | 1.535 | 56.16 |
| 11* | 0.973 | 0.250 | | |
| 12 | Infinity | 0.210 | 1.517 | 64.20 |
| 13 | Infinity | 0.773 | | |
| Image Plane | Infinity | | | |

Constituent Lens Data

| Lens | Start Surface | Focal Length |
|---|---|---|
| 1 | 2 | 2.905 |
| 2 | 4 | −3.890 |
| 3 | 6 | 8.973 |
| 4 | 8 | 1.886 |
| 5 | 10 | −1.727 |

Aspheric Surface Data

| | 2nd Surface | 3rd Surface | 4th Surface | 5th Surface | 6th Surface |
|---|---|---|---|---|---|
| k | 2.244E−01 | 0.000E+00 | 0.000E+00 | −1.097E+01 | 0.000E+00 |
| A4 | −1.043E−02 | −2.143E−01 | −3.155E−01 | −1.066E−01 | −2.504E−01 |
| A6 | −4.942E−02 | 1.012E+00 | 1.639E+00 | 8.038E−01 | 1.299E−01 |
| A8 | 1.339E−02 | −2.884E+00 | −4.118E+00 | −1.366E+00 | −9.426E−02 |
| A10 | −1.003E−01 | 4.539E+00 | 6.281E+00 | 1.539E+00 | 1.765E−01 |
| A12 | 3.042E−01 | −4.551E+00 | −6.306E+00 | −1.367E+00 | −1.021E−01 |
| A14 | −4.100E−01 | 1.966E+00 | 2.948E+00 | 6.429E−01 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −3.523E+00 | 0.000E+00 | −7.318E+00 |
| A4 | −1.028E−01 | −1.293E−02 | −1.407E−01 | −1.208E−01 | −1.106E−01 |
| A6 | −1.514E−02 | 6.409E−02 | 1.220E−01 | 3.208E−02 | 4.740E−02 |
| A8 | −7.072E−02 | −3.081E−02 | −3.180E−02 | 6.007E−03 | −1.614E−02 |
| A10 | 8.306E−02 | −4.417E−02 | 2.362E−02 | −3.603E−03 | 3.435E−03 |
| A12 | 0.000E+00 | 2.357E−02 | −1.486E−02 | 5.280E−04 | −4.287E−04 |
| A14 | 0.000E+00 | 0.000E+00 | 2.515E−03 | −2.564E−05 | 2.416E−05 |
| A16 | 0.000E+00 | 0.000E+00 | 0.000E+00 | 0.000E+00 | 0.000E+00 |

As shown in Table 10, the imaging lens according to Example 8 satisfies all the conditional expressions (1) to (9).

Figure 16:
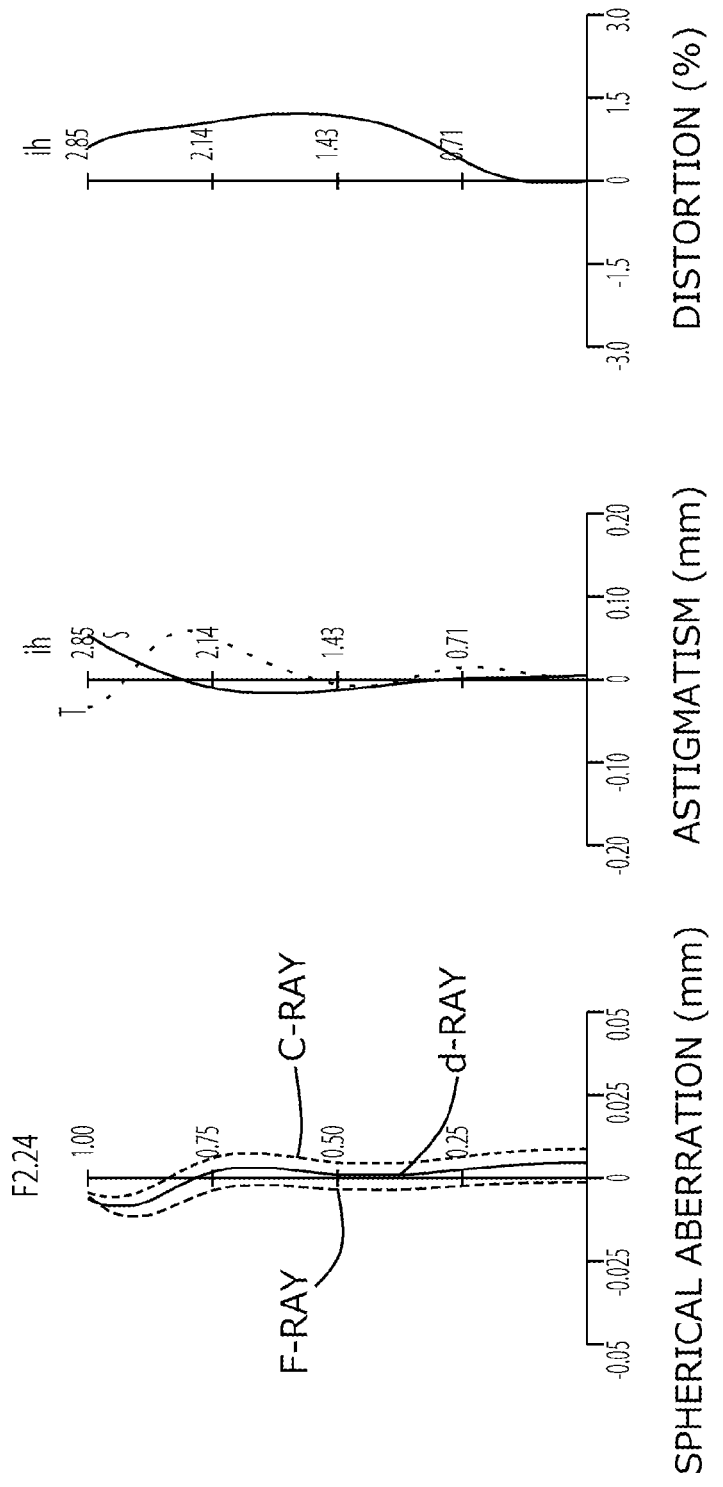
FIG. 16 shows spherical aberration, astigmatism, and distortion of the imaging lens according to Example 8.
Figure 17:
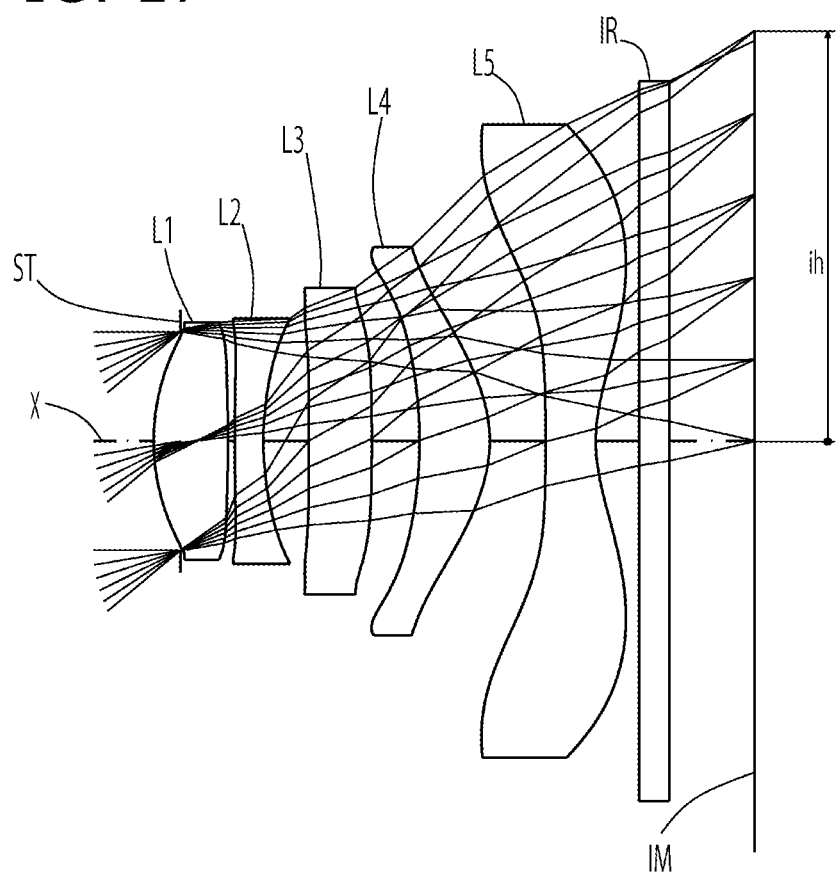
FIG. 17 is a schematic view showing the general configuration of an imaging lens according to Example 9.

FIG. 16 shows spherical aberration (mm), astigmatism (mm), and distortion (%) of the imaging lens according to Example 8. As shown in FIG. 16, each aberration is properly corrected.

Further, the total track length TLA is 4.11 mm, so that reduction in height is realized with five constituent lenses.

Further, the imaging lens provides a wide field of view of nearly 80 degrees and brightness with an F-value of 2.24.

Example 9

The basic lens data is shown below in Table 9.

TABLE 9

Example 9
in mm
f = 3.41
Fno = 2.24
ω(°) = 39.8
ih = 2.86
TLA = 4.11
bf = 1.04

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.185 | | |
| 2* | 1.500 | 0.515 | 1.544 | 55.57 |
| 3* | −26.135 | 0.048 | | |
| 4* | 10.000 | 0.200 | 1.635 | 23.97 |
| 5* | 2.131 | 0.314 | | |
| 6* | 16.250 | 0.437 | 1.544 | 55.57 |
| 7* | −98.000 | 0.333 | | |
| 8* | −3.064 | 0.488 | 1.544 | 55.57 |
| 9* | −0.976 | 0.386 | | |
| 10* | 95.749 | 0.351 | 1.535 | 56.16 |
| 11* | 1.138 | 0.250 | | |
| 12 | Infinity | 0.210 | 1.517 | 64.20 |
| 13 | Infinity | 0.647 | | |
| Image Plane | Infinity | | | |

Constituent Lens Data

| Lens | Start Surface | Focal Length |
|---|---|---|
| 1 | 2 | 2.626 |
| 2 | 4 | −4.308 |
| 3 | 6 | 25.666 |
| 4 | 8 | 2.432 |
| 5 | 10 | −2.156 |

Aspheric Surface Data

| | 2nd Surface | 3rd Surface | 4th Surface | 5th Surface | 6th Surface |
|---|---|---|---|---|---|
| k | 3.119E−01 | 0.000E+00 | 0.000E+00 | −5.650E+00 | 0.000E+00 |
| A4 | −1.405E−02 | −1.796E−01 | −3.154E−01 | −9.742E−02 | −1.706E−01 |
| A6 | −8.208E−03 | 1.022E+00 | 1.597E+00 | 7.114E−01 | 9.459E−02 |
| A8 | 7.288E−03 | −2.948E+00 | −4.241E+00 | −1.372E+00 | −6.499E−02 |
| A10 | −1.384E−01 | 4.430E+00 | 6.242E+00 | 1.611E+00 | 2.341E−01 |
| A12 | 3.279E−01 | −4.534E+00 | −6.280E+00 | −1.353E+00 | −1.384E−01 |
| A14 | −4.183E−01 | 2.218E+00 | 3.270E+00 | 6.675E−01 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −3.306E+00 | 0.000E+00 | −6.148E+00 |
| A4 | −1.301E−01 | 4.946E−03 | −9.362E−02 | −1.456E−01 | −1.121E−01 |
| A6 | 6.063E−02 | −1.076E−02 | 8.425E−02 | 3.393E−02 | 4.744E−02 |
| A8 | −1.455E−01 | −5.601E−03 | −3.655E−02 | 6.700E−03 | −1.622E−02 |
| A10 | 1.133E−01 | −2.889E−02 | 2.845E−02 | −3.665E−03 | 3.475E−03 |
| A12 | 0.000E+00 | 1.873E−02 | −1.273E−02 | 5.251E−04 | −4.245E−04 |
| A14 | 0.000E+00 | 0.000E+00 | 1.775E−03 | −2.553E−05 | 2.249E−05 |
| A16 | 0.000E+00 | 0.000E+00 | 0.000E+00 | 0.000E+00 | 0.000E+00 |

As shown in Table 10, the imaging lens according to Example 9 satisfies all the conditional expressions (1) to (9).

FIG. 18 shows spherical aberration (mm), astigmatism (mm), and distortion (%) of the imaging lens according to Example 9. As shown in FIG. 18, each aberration is properly corrected.

Further, the total track length TLA is 4.11 mm, so that reduction in height is realized with five constituent lenses. Further, the imaging lens provides a wide field of view of nearly 80 degrees and brightness with an F-value of 2.24.

As explained above, the imaging lenses according to the preferred embodiment of the present invention enable implementation of an optical system in which total track length TLA is 4.4 mm or less, realizing reduction in height with a ratio (TTL/2ih) of 0.75 or less between the total track length TLA and the maximum image height ih, and corresponding to a wide field of view of nearly 74 degrees or more and brightness with an F-value of 2.3 or less, with various aberrations corrected satisfactorily.

Table 10 shows data on Examples 1 to 9 in relation to the conditional expressions (1) to (9).

TABLE 10

|  | Example 1 | Example 2 | Example 3 | Example 4 | Example 5 |
|---|---|---|---|---|---|
| Conditional Expression (1)<br>$2.0 < r7/r8 < 5.0$ | 3.390 | 3.256 | 3.165 | 2.928 | 2.941 |
| Conditional Expression (2)<br>$-1.35 < f4/f5 < -0.8$ | −1.048 | −1.117 | −1.043 | −1.042 | −1.032 |
| Conditional Expression (3)<br>$TLA/2ih < 0.80$ | 0.747 | 0.747 | 0.747 | 0.747 | 0.747 |
| Conditional Expression (4)<br>$1.50 < Nd < 1.65$ | 1.535~1.635 | 1.544~1.635 | 1.535~1.635 | 1.544~1.635 | 1.544~1.635 |
| Conditional Expression (5)<br>$0.7 < ih/f < 1.0$ | 0.772 | 0.772 | 0.771 | 0.771 | 0.770 |
| Conditional Expression (6)<br>$0.9 < TLA/f < 1.45$ | 1.152 | 1.153 | 1.152 | 1.151 | 1.151 |
| Conditional Expression (7)<br>$0.24 < bf/f < 0.41$ | 0.320 | 0.317 | 0.320 | 0.320 | 0.329 |
| Conditional Expression (8)<br>$f4 < f1$ | 1.973 < 2.435 | 2.022 < 2.809 | 2.041 < 2.438 | 2.146 < 2.466 | 2.177 < 2.54 |
| Conditional Expression (9)<br>$0.50 < r4/f < 1.0$ | 0.726 | 0.688 | 0.706 | 0.697 | 0.719 |

|  | Example 6 | Example 7 | Example 8 | Example 9 |
|---|---|---|---|---|
| Conditional Expression (1)<br>$2.0 < r7/r8 < 5.0$ | 4.080 | 3.629 | 3.660 | 3.140 |
| Conditional Expression (2)<br>$-1.35 < f4/f5 < -0.8$ | −1.042 | −1.090 | −1.092 | −1.128 |
| Conditional Expression (3)<br>$TLA/2ih < 0.80$ | 0.701 | 0.721 | 0.720 | 0.720 |
| Conditional Expression (4)<br>$1.50 < Nd < 1.65$ | 1.535~1.635 | 1.535~1.635 | 1.535~1.635 | 1.535~1.635 |
| Conditional Expression (5)<br>$0.7 < ih/f < 1.0$ | 0.859 | 0.841 | 0.838 | 0.839 |
| Conditional Expression (6)<br>$0.9 < TLA/f < 1.45$ | 1.204 | 1.212 | 1.206 | 1.207 |
| Conditional Expression (7)<br>$0.24 < bf/f < 0.41$ | 0.341 | 0.342 | 0.342 | 0.305 |
| Conditional Expression (8)<br>$f4 < f1$ | 1.866 < 3.023 | 1.937 < 2.926 | 1.886 < 2.905 | 2.432 < 2.626 |
| Conditional Expression (9)<br>$0.50 < r4/f < 1.0$ | 0.900 | 0.643 | 0.632 | 0.626 |

The imaging lens composed of five constituent lenses according to the preferred embodiment of the present invention enhances the performance of the camera, when the imaging lens is applied to an optical system built in image pickup devices mounted in mobile terminals such as smartphones, mobile phones and PDAs (Personal Digital Assistants), information terminals such as game consoles and PCs, and consumer electronics added with camera function, and the like that are advancing in reduction of size and height.

The effects of the present invention are as follows.

According to the present invention, it is possible to provide a small-sized, low-height and low-cost imaging lens with five constituent lenses, which provides a wide field of view, corrects various aberrations favorably, and corresponds to sufficient brightness.

What is claimed is:

1. An imaging lens to form an image of an object on a solid-state image sensor, in which the elements are arranged in order from an object side to an image side, comprising:

an aperture stop, a first lens with positive refractive power having a convex surface on the object side, a second lens with negative refractive power having a concave surface on the image side, a third lens with positive or negative refractive power having an aspheric shape on both lens surfaces, a fourth lens with positive refractive power having a convex surface on the image side, and a fifth lens with negative refractive power having a concave surface on the image side near an optical axis as a double-sided aspheric lens, all the lenses are made of plastic material, and conditional expressions (1) through (4) below are satisfied:

$$2.928 < r7/r8 < 5.0 \qquad (1)$$

$$-1.128 < f4/f5 < -1.032 \qquad (2)$$

$$TLA/2ih \leq 0.747 \qquad (3)$$

$$1.50 < Nd < 1.65 \qquad (4)$$

where
- r7: curvature radius of the object-side surface of the fourth lens
- r8: curvature radius of the image-side surface of the fourth lens
- f4: focal length of the fourth lens
- f5: focal length of the fifth lens
- TLA: distance on the optical axis from the object-side surface of an optical element nearest to the object to the image plane in which filters are removed
- ih: maximum image height
- Nd: refractive index with respect to d-ray of the first lens, the second lens, the third lens, the fourth lens, and the fifth lens.

2. The imaging lens according to claim 1, wherein the fifth lens has a biconcave shape near the optical axis.

3. The imaging lens according to claim 1, wherein the fifth lens has a meniscus shape having a convex surface on the object side near the optical axis.

4. The imaging lens according to claim 1, wherein a conditional expression (5) below is satisfied:

$$0.7 < ih/f < 1.0 \tag{5}$$

where
- ih: maximum image height
- f: focal length of the overall optical system of the imaging lens.

5. The imaging lens according to claim 1, wherein conditional expressions (6) and (7) below are satisfied:

$$0.9 < TLA/f < 1.45 \tag{6}$$

$$0.24 < bf/f < 0.41 \tag{7}$$

where
- TLA: distance on the optical axis from the object-side surface of an optical element nearest to the object to the image plane in which filters are removed
- bf: distance on the optical axis from the image-side surface of the fifth lens to the image plane in which filters are removed
- f: focal length of the overall optical system of the imaging lens.

6. The imaging lens according to claim 1, wherein a conditional expression (8) below is satisfied:

$$f4 < f1 \tag{8}$$

where
- f1: focal length of the first lens
- f4: focal length of the fourth lens.

7. The imaging lens according to claim 1, wherein a conditional expression (9) below is satisfied:

$$0.50 < r4/f < 1.0 \tag{9}$$

where
- r4: curvature radius of the image-side surface of the second lens
- f: focal length of the overall optical system of the imaging lens.

* * * * *